United States Patent
Baleine et al.

(10) Patent No.: US 10,437,083 B1
(45) Date of Patent: Oct. 8, 2019

(54) INDIVIDUALLY ADDRESSABLE INFRARED MASK ARRAY

(71) Applicants: LOCKHEED MARTIN CORPORATION, Bethesda, MD (US); THE PENN STATE RESEARCH FOUNDATION, University Park, PA (US)

(72) Inventors: Clara Rivero Baleine, Orlando, FL (US); Theresa S. Mayer, Port Matilda, PA (US); Xiaoming Liu, Englewood Cliffs, NJ (US); Christina H. Drake, Orlando, FL (US)

(73) Assignees: Lockheed Martin Corporation, Bethesda, MD (US); The Penn State Research Foundation, University City, PA (US)

( * ) Notice: Subject to any disclaimer, the term of this patent is extended or adjusted under 35 U.S.C. 154(b) by 181 days.

(21) Appl. No.: 14/518,106

(22) Filed: Oct. 20, 2014

(51) Int. Cl.
*G02F 1/01* (2006.01)
*G02F 1/00* (2006.01)

(52) U.S. Cl.
CPC ............ *G02F 1/0147* (2013.01); *G02F 1/009* (2013.01); *G02F 1/0054* (2013.01); *G02F 1/0063* (2013.01)

(58) Field of Classification Search
None
See application file for complete search history.

(56) References Cited

U.S. PATENT DOCUMENTS

| | | | |
|---|---|---|---|
| 3,362,797 A | 1/1968 | Shaskolskaja et al. | |
| 3,825,317 A | 7/1974 | Inoue et al. | |
| 4,209,229 A | 6/1980 | Rittler | |
| 4,545,641 A * | 10/1985 | Sobey, Jr. | G02F 1/0147 359/288 |
| 4,635,082 A | 1/1987 | Domoto et al. | |

(Continued)

OTHER PUBLICATIONS

Notice of Allowance for U.S. Appl. No. 14/172,175, dated Jan. 15, 2016, 10 pages.

(Continued)

*Primary Examiner* — William R Alexander
*Assistant Examiner* — Gary W O'Neill
(74) *Attorney, Agent, or Firm* — Withrow & Terranova, PLLC

(57) ABSTRACT

A mask array apparatus includes a monolithic structure that includes a substrate layer transmissive for at least a portion of an infrared wavelength band and an array of individually addressed pixel structures. Each pixel structure is in stacked relation above or below the substrate layer, and includes at least one micro-plate heating element layer, circuitry, and at least one phase change material (PCM) element. The heating element layer is transmissive for the wavelength band, and has switchable on and off states configured to produce temperature changes. The circuitry is configured to individually address the heating element layer, separately from heating element layers in other pixel structures, to switch the heating element layer between the on and off states. The PCM is in stacked relation above or below the heating element layer and configured to change transmissive states in the wavelength band in response to the temperature changes.

24 Claims, 14 Drawing Sheets

(56) References Cited

U.S. PATENT DOCUMENTS

| | | | |
|---|---|---|---|
| 4,799,795 A * | 1/1989 | Fateley | G01J 3/2846 356/310 |
| 4,867,544 A | 9/1989 | Bornstein et al. | |
| 5,102,694 A | 4/1992 | Taylor et al. | |
| 5,166,827 A | 11/1992 | Noda | |
| 5,171,344 A | 12/1992 | Noda | |
| 5,200,858 A | 4/1993 | Hagerty et al. | |
| 5,236,486 A | 8/1993 | Blankenbecler et al. | |
| 5,245,328 A | 9/1993 | Garrett | |
| 5,254,454 A | 10/1993 | Mimiya et al. | |
| 5,262,896 A | 11/1993 | Blankenbecler | |
| 5,294,240 A | 3/1994 | Sanghera et al. | |
| 5,336,643 A | 8/1994 | Goto et al. | |
| 5,349,473 A | 9/1994 | Kurasawa et al. | |
| 5,448,409 A | 9/1995 | Noda | |
| 5,459,613 A | 10/1995 | Xu | |
| 5,537,505 A | 7/1996 | Borrelli et al. | |
| 5,608,568 A * | 3/1997 | Blodgett | G02F 1/0147 359/245 |
| 5,731,906 A | 3/1998 | Morita | |
| 5,796,525 A | 8/1998 | Dempewolf et al. | |
| 5,867,264 A | 2/1999 | Hinnrichs | |
| 5,917,105 A | 6/1999 | Xu et al. | |
| 6,027,672 A | 2/2000 | Weitzel et al. | |
| 6,236,493 B1 | 5/2001 | Schmidt et al. | |
| 6,362,118 B1 | 3/2002 | Beall et al. | |
| 6,519,975 B1 | 2/2003 | Bange et al. | |
| 6,570,784 B2 | 5/2003 | Lowrey | |
| 6,586,474 B2 | 7/2003 | Webber et al. | |
| 6,586,761 B2 | 7/2003 | Lowrey | |
| 6,673,497 B2 | 1/2004 | Efimov et al. | |
| 6,687,153 B2 | 2/2004 | Lowrey | |
| 6,819,469 B1 * | 11/2004 | Koba | G03F 7/70291 359/290 |
| 6,908,812 B2 | 6/2005 | Lowrey | |
| 6,959,753 B1 | 11/2005 | Weber et al. | |
| 7,005,665 B2 | 2/2006 | Furkay et al. | |
| 7,119,353 B2 | 10/2006 | Lankhorst et al. | |
| 7,148,164 B2 | 12/2006 | Minamikawa et al. | |
| 7,164,818 B2 | 1/2007 | Bryan et al. | |
| 7,173,767 B2 | 2/2007 | Satzke | |
| 7,208,133 B2 | 4/2007 | Cho et al. | |
| 7,315,683 B2 | 1/2008 | Beall et al. | |
| 7,326,500 B1 | 2/2008 | Glebov et al. | |
| 7,405,883 B2 | 7/2008 | Hashimoto | |
| 7,501,648 B2 | 3/2009 | Chen et al. | |
| 7,570,432 B1 | 8/2009 | Yonak | |
| 7,687,871 B2 | 3/2010 | Maimon | |
| 7,800,095 B2 | 9/2010 | An et al. | |
| 7,880,194 B2 | 2/2011 | Breitwisch et al. | |
| 8,120,770 B2 | 2/2012 | Huang et al. | |
| 8,178,387 B2 | 5/2012 | Cheng et al. | |
| 8,306,786 B1 | 11/2012 | Lynch et al. | |
| 2002/0022564 A1 | 2/2002 | Minamikawa et al. | |
| 2002/0088952 A1 | 7/2002 | Rao et al. | |
| 2003/0132386 A1 * | 7/2003 | Carr | G01J 3/26 250/338.1 |
| 2004/0114204 A1 | 6/2004 | Klug et al. | |
| 2005/0030784 A1 | 2/2005 | Johnson | |
| 2005/0032623 A1 | 2/2005 | Araujo et al. | |
| 2005/0137075 A1 | 6/2005 | Messerschmidt et al. | |
| 2006/0051047 A1 | 3/2006 | Beall et al. | |
| 2006/0068154 A1 | 3/2006 | Parce et al. | |
| 2006/0097342 A1 | 5/2006 | Parkinson | |
| 2006/0135341 A1 | 6/2006 | Ellison et al. | |
| 2007/0034833 A1 | 2/2007 | Parce et al. | |
| 2007/0045771 A1 | 3/2007 | Philipp et al. | |
| 2007/0093373 A1 | 4/2007 | Borrelli et al. | |
| 2007/0116409 A1 | 5/2007 | Bryan et al. | |
| 2007/0181867 A1 | 8/2007 | Hewak et al. | |
| 2007/0254490 A1 * | 11/2007 | Jain | G02F 1/1362 438/736 |
| 2008/0192331 A1 | 8/2008 | Wang et al. | |
| 2009/0236079 A1 | 9/2009 | Khodadadi | |
| 2010/0238720 A1 * | 9/2010 | Tio Castro | H01L 45/06 365/163 |
| 2011/0013287 A1 | 1/2011 | Huang et al. | |
| 2011/0266445 A1 * | 11/2011 | Beratan | G01J 1/02 250/338.4 |
| 2011/0293942 A1 | 12/2011 | Cornejo et al. | |
| 2012/0127562 A1 | 5/2012 | Kim et al. | |
| 2012/0213270 A1 | 8/2012 | Baraniuk et al. | |
| 2013/0043375 A1 * | 2/2013 | Baleine | G11C 13/0004 250/237 R |
| 2013/0314765 A1 | 11/2013 | Padilla et al. | |
| 2014/0378818 A1 | 12/2014 | Drake et al. | |
| 2015/0098032 A1 * | 4/2015 | Park | G02F 1/0147 349/21 |
| 2015/0177426 A1 | 6/2015 | Sakoske et al. | |
| 2017/0249988 A1 * | 8/2017 | Kan'an et al. | G11C 13/003 |

OTHER PUBLICATIONS

Jared et al., "Electrically Addressed Spatial Light Modulator that Uses a Dynamic Memory," Optics Letters, Nov. 15, 1991, pp. 1785-1787, vol. 16, No. 22, Boulder, CO.

Jiang et al., "Design, Fabrication and Testing of a Micromachined Thermo-Optical Light Modulator Based on a Vanadium Dioxide Array," J. Micromech. Microeng., May 13, 2004, pp. 833-840, Newark, NJ.

Verleur et al., "Optical Properties of VO2 Between 0.25 and 5 eV," Physical Review, Aug. 15, 1968, pp. 788-798, vol. 172, No. 3, Murray Hill, NJ.

Siegel, J. et al., "Rewritable phase-change optical recording in $Ge_2 Sb_2 Te_5$ films induced by picosecond laser pulses," Applied Physics Letters, vol. 84, Issue 13, Mar. 29, 2004, American Institute of Physics, 4 pages.

Non-Final Office Action for U.S. Appl. No. 13/585,577, dated Feb. 9, 2015, 12 pages.

Final Office Action for U.S. Appl. No. 13/585,577, dated May 26, 2015, 10 pages.

Notice of Allowance for U.S. Appl. No. 13/585,577, dated Aug. 20, 2015, 8 pages.

Non-Final Office Action for U.S. Appl. No. 14/172,175, dated Jul. 28, 2015, 11 pages.

Non-Final Office Action for U.S. Appl. No. 14/957,671, dated Nov. 22, 2016, 9 pages.

Final Office Action for U.S. Appl. No. 14/957,671, dated Apr. 11, 2017, 5 pages.

Notice of Allowance for U.S. Appl. No. 14/957,671, dated Jun. 23, 2017, 12 pages.

Non-Final Office Action for U.S. Appl. No. 15/135,813, dated Feb. 6, 2018, 9 pages.

Notice of Allowance for U.S. Appl. No. 15/135,813, dated Jul. 13, 2018, 8 pages.

* cited by examiner

INDIVIDUALLY ADDRESSABLE INFRARED MASK ARRAY

BACKGROUND

Applications such as spatial light modulation, non-mechanical shutters, coded masks for compressive sensing, reconfigurable optical filters, and similar devices meant to selectively allow or restrict incident light onto particular pixels or portions of an optical sensor may require an optical shuttering, filtering, or redirection device having a high degree of precision and reliability. Mechanical eyelid shutter technology, liquid crystal (LC) spatial light modulators (SLM), and microelectromechanical system (MEMS) digital mirror array (DMA) have been all implemented for spatial light modulation type applications, but they exhibit limitations for infrared applications.

For example, mechanical eyelid shutters and MEMS DMAs are mechanical devices, which limit how fast the shutter can be turned on/off. LCs modulators suffer from polarization dependence, and many LC materials exhibit strong absorption bands in the infrared. Moreover, most of these SLMs are operated in a reflective mode that imposes more complex arrangements for shuttering in imaging applications.

SUMMARY

Embodiments relate to a system and a method for an individually addressable infrared mask array as a spatial light modulator (SLM) that is solid state, monolithic, and effective in at least a portion of the infrared spectrum from the mid-wavelength infrared (MWIR) and into the long-wave infrared (LWIR). This optical band has a wavelength range from about 3 micrometers (also called microns, and abbreviated μm, 1 μm=$10^{-6}$ meters) to about 12 microns. As used here, an array is a co-planar arrangement of one or more array elements in one or two dimensions. In various embodiments, the mask provides advantages in simplicity of use as a shutter, and increased reliability due to solid state construction. A monolithic integrated circuit is defined as circuit in which all or some of the circuit elements are inseparably associated and electrically interconnected so that it is considered to be indivisible for the purposes of construction and commerce. In similar manner, as used herein, a monolithic structure is defined as a structure in which the structure elements are inseparably associated and interconnected so that the structure is considered to be indivisible for the purposes of construction, use and commerce.

In a first set of embodiments, an SLM apparatus is a mask array. That mask array apparatus includes a monolithic structure that includes a substrate layer transmissive for at least a portion of an infrared wavelength band and an array of individually addressed pixel structures. Each pixel structure is in stacked relation above or below the substrate layer, and includes at least one micro-plate heating element layer, circuitry, and at least one phase change material (PCM) element. The heating element layer is transmissive for the wavelength band, and has switchable on and off states configured to produce temperature changes. The circuitry is configured to individually address the heating element layer, separately from heating element layers in other pixel structures, to switch the heating element layer between the on and off states. The PCM is in stacked relation above or below the heating element layer and configured to change transmissive states in the wavelength band in response to the temperature changes.

In some embodiments of the first set, the circuitry is not in stacked relation above or below the at least one PCM elements. In some embodiments, the circuitry is complementary metal-oxide semiconductor (CMOS) circuitry.

In some embodiments of the first set, the electrical resistive heating material is a silicon-based material selected from a group comprising: n-doped silicon; p-doped silicon; and polysilicon.

In some embodiments of the first set, the phase change material is a transition metal oxide-based material, such as vanadium dioxide ($VO_2$).

In some embodiments of the first set, the phase change material is a chalcogenide-based material, such as Germanium Antimony (stibium) Tellurium (GST), $Ge_2Sb_2Te_5$.

In some embodiments of the first set, the pixel structure includes a thermal spreading layer in stacked relation above or below the at least one micro-plate heating element layer and configured to remove heat from each PCM element of the array of PCM elements, wherein the thermal spreading layer is transmissive in at least the portion of the infrared wavelength band.

In some embodiments of the first set, a system includes the SLM and an optical coupler, such as an imaging system, configured to pass electromagnetic radiation from a target onto the SLM, and an optical detector configured to detect electromagnetic radiation passed through the apparatus.

In a second set of embodiments, a method includes forming a substrate layer transmissive for at least a portion of an infrared wavelength band; and monolithically depositing an array of pixel structures. Each pixel structure is formed by depositing at least one micro-plate heating element layer transmissive for at least the portion of the infrared wavelength band, and having switchable on and off states configured to produce temperature changes. Forming the pixel structure further includes assembling a complementary metal-oxide semiconductor (CMOS) circuitry configured to individually address the at least one micro-plate heating element layer to switch the at least one micro-plate heating element layer between the on and off states. Still further, forming the pixel structure includes depositing at least one phase change material (PCM) element in stacked relation above or below the at least one micro-plate heating element layer and configured to change transmissive states in at least the portion of the infrared wavelength band in response to the temperature changes.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1A:
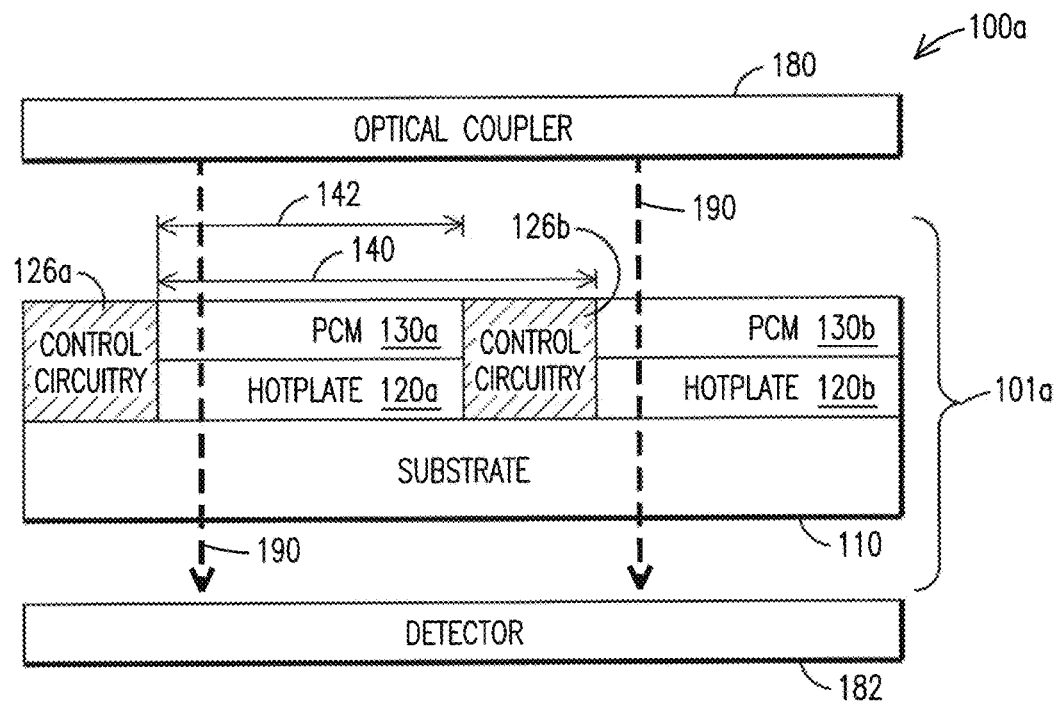
FIG. 1A is a block diagram that illustrates an example system using an individually addressable array of mask elements in a first state of a phase change material (PCM), according to an embodiment.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

1. Overview

Certain phase change materials (PCM) reversibly change their molecular configuration in the solid state (e.g., from amorphous to crystalline), and thus their optical properties, based on temperature changes. This property is utilized in order to construct arrays of masking elements, each controlled by a heating element, also called herein a "hotplate" or "micro-plate," the latter term implying a size less than about 1000 microns. When the heating elements are constructed on the microscale of 1 to 1000 microns, a microscale mask array results. Each array element of the mask array is also called a pixel or pixel structure. Such a masking array can be used in a variety of applications, as listed in the background, including spatial light modulation, non-mechanical shutters, coded masks for compressive sensing, reconfigurable optical filters. In various embodiments described herein, a masking array is configured that affects the transmission of infrared radiation through the device, in at least a portion of the infrared wavelength band, such as all or some of either or both of the MWIR and LWIR wavelength bands. Thus every layer of a masking element other than the PCM, including the heating element, is substantively transmissive in at least a portion of the MWIR to LWIR wavelength range. The electronics that control which heating elements are turned on and for how long thus control the optical properties of the mask array.

FIG. 1A is a block diagram that illustrates an example system using an individually addressable array of mask elements in a first state of a phase change material (PCM), according to an embodiment. The system 100a includes an optical coupler 180, optical detector 182 and, disposed between them, an IR mask array device 101a in one state that passes IR radiation 190. The optical coupler 180 comprises one or more components known in the art for directing or focusing IR radiation from a source, including freespace, a lens, an optical fiber, a mirror, a beam splitter, a diffraction grating, a filter, and an aperture. In various embodiments, the source is a laser, one or more reflected beams from a target, or one or more beams from an emitting object, such as a heat source. The optical detector 182 responds to or records optical energy that impinges on one or more detector elements, such as an infrared focal plane array (FPA).

The device 101a comprises a substrate 110 that is substantively transmissive in at least a portion of the MWIR to LWIR wavelength bands on which is disposed an array of masking elements (pixel structures). Each masking element includes a PCM element (e.g., PCM element 130a or 130b, collectively referenced hereinafter as PCM element 130) and a heating element (e.g., hotplate 120a or 120b, collectively referenced hereinafter as hotplates 120 or micro-plate heating element layers). Also disposed on the substrate is control circuitry configured to switch on and off each heating element, such as control circuitry 126a to switch hotplate 120a on and off and control circuitry 126b to switch hotplate 120b on and off. Thus, in some embodiments, the circuitry 126 is configured to switch the at least one micro-plate heating element layer between the on and off state. The PCM is configured to change transmissive states in at least the portion of the infrared wavelength band in response to the temperature changes. In some embodiments, the control circuitry is not transmissive to IR radiation in the MWIR or LWIR wavelength bands. In some embodiments, the control circuitry is a complementary metal oxide semiconductor (CMOS) circuitry that can be formed monolithically with some or all of the other elements of the device 101. For example, by passing a current through a hotplate made of an electrical resistive material, the hotplate heats up and its temperature rises. This elevated temperature transports heat to neighboring components and raises their temperature. As a result, the nearby PCM element can change between an amorphous and crystalline configuration of molecules and thus change its optical properties. Thus each hotplate 120 has switchable on and off states configured to produce temperature changes. The pitch 140 is the distance between adjacent masking elements, and the active area 142 is related to the size of the masking elements that is capable of passing IR radiation 190.

As depicted in FIG. 1A, each hotplate 120 is in the same condition or state or temperature range, and the PCM 130 of each element is in a first state that is transmissive to IR radiation 190 which thus passes through the device 101a and onto the detector 182.

Figure 1B:
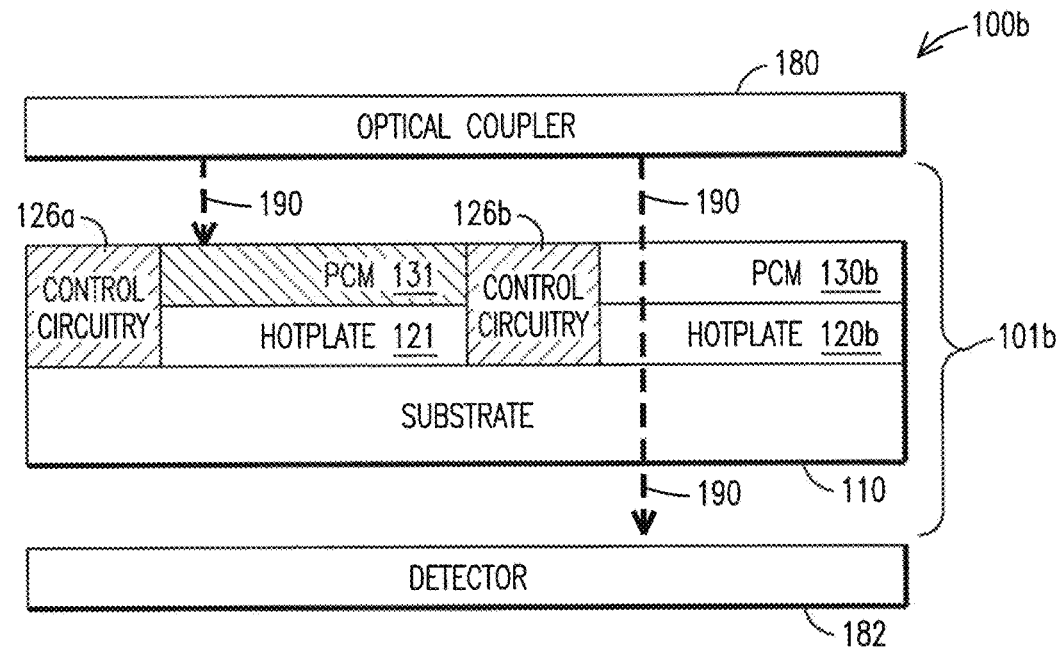
FIG. 1B is a block diagram that illustrates an example system using an individually addressable array of mask elements in a second state of the PCM, according to an embodiment.

FIG. 1B is a block diagram that illustrates an example system using an individually addressable array of mask elements, with at least one in a second state of the PCM, according to an embodiment. In this state, the device 101b includes a hotplate 121 in a different condition (or state or temperature range) from hotplate 120b (e.g., hotplate 121 is or has been switched on while hotplate 120b is switched off, or hotplate 121 switched off when hotplate 120b is or has been switched on). In this condition, PCM 131 is in a different second state that substantively more absorbs or reflects IR radiation 190 in one or more bands of the MWIR to LWIR wavelength range, rather than transmits IR radiation 190 throughout the MWIR to LWIR wavelength range as PCM 130b does in the first state. Thus the IR radiation 190 is masked or blocked, at least to some extent, by PCM element 131.

Mask array device 101a with PCM elements in a first set of states, and mask array device 101b with PCM elements in a second set of states, as well as the same device with PCM elements in any other set of states, is collectively referenced hereinafter as mask array device 101. A PCM element 130a and 130b in a first state, and PCM element 131 in a second state, are collectively referenced hereinafter as PCM elements 130. Similarly, a heating element, such as hotplates 120a and 120b, in a first condition and heating element, such as hotplate 121, in a second condition, are collectively referenced hereinafter as heating elements 120. Control circuitry 126a and 126b is collectively referenced hereinafter as control circuitry 126.

Thus an IR mask array device 101 includes a substrate layer 110 substantively transmissive for middle and long-wave infrared radiation and an array of PCM elements 130 stacked with the substrate layer 110. Each PCM element 130 is configured to change absorption in a first wavelength band of MWIR to LWIR radiation based on temperature change. The device 100 includes an array of heating elements 120, each heating element 120 stacked with a corresponding PCM element 130 of the array of PCM elements. Each heating element 120 includes an electrical resistive heating material, and is substantively transmissive for middle and long-wave infrared radiation. Each heating element 120 is configured to increase a temperature of the corresponding PCM element 130 when the heating element is switched on. The device 101 also includes a control circuit 126 configured to switch on and switch off individually any heating element 120 of the array of heating elements. The control circuit 126 is disposed to permit substantive transmission of any middle and long-wave infrared radiation transmitted through the array of PCM elements 130.

Thus the PCM is configured to undergo a refractive index (n) and an extinction coefficient (k) change corresponding to a change between a blocking set state and a transmissive reset state for at least one portion of the infrared wavelength band. In various embodiments, one or more of the substrate 110, hotplate 120 or PCM element 130, includes additional materials or layers that are transmissive in the portion of the MWIR to LWIR band and that provide thermal or electrical insulation or conduction, or some combination. Thus, in some embodiments, the pixel structure is configured with optical and thermal properties so that the switching the at least one micro-plate heating element layer between the on and off states causes the PCM to undergo the refractive index (n) and an extinction coefficient (k) change corresponding to the change between the set state and the reset state.

Figure 1C:
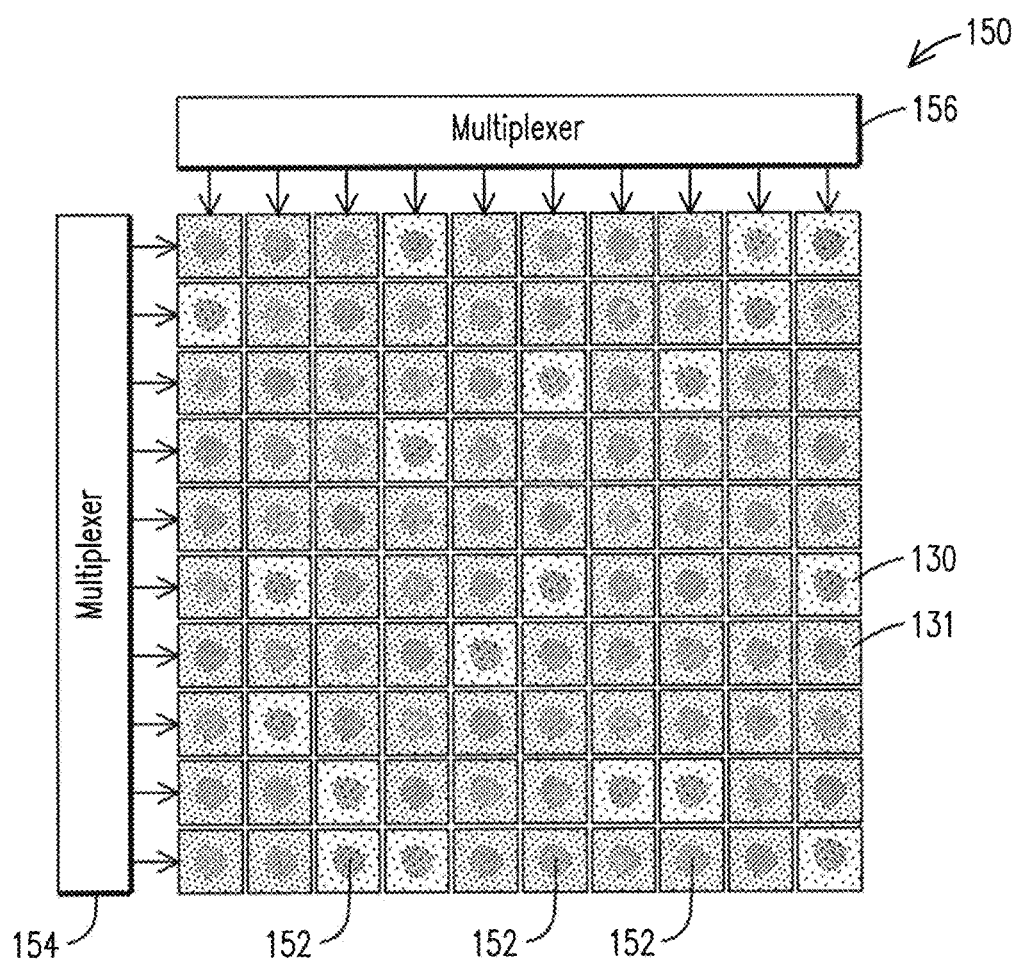
FIG. 1C is a block diagram that illustrates an example two-dimensional (2D) base array of mask elements, according to an embodiment.

FIG. 1C is a block diagram that illustrates an example two-dimensional (2D) base array 150 of mask elements 152, according to an embodiment. Mask array 150 is an array of 10 rows×10 columns of mask elements. A multiplexer 156 sends signals that cause mask elements 152 in certain columns to become activated, while multiplexer 154 sends signals that cause mask elements 152 in certain rows to become activated. A mask element that is simultaneously activated by both multiplexers 154 and 156, has its heating element switched on and its PCM state changed. Thus some mask elements are IR transmissive elements 130 in one state and some are IR blocking elements 131 in a different state.

Figure 1D:
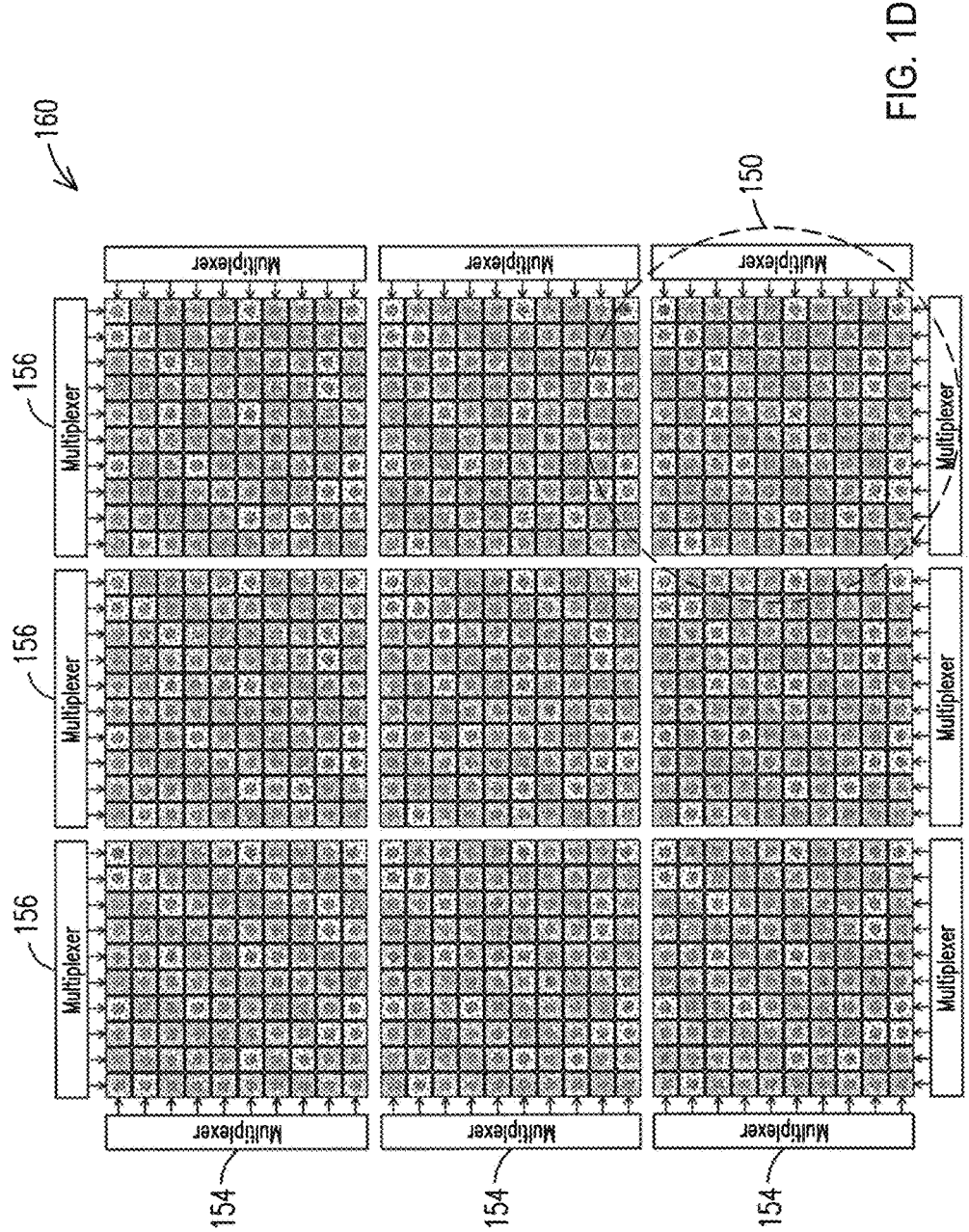
FIG. 1D is a block diagram that illustrates an example 2D array of the 2D base arrays, according to an embodiment.

In some embodiments, such 10×10 arrays can be associated with one pixel of a detector, e.g., for compressive sensing or to provide controllable gray-scale operation between full transmission and full rejection modes. Then a full mask for the full detector is made up of an array of these base arrays 150. FIG. 1D is a block diagram that illustrates an example 2D array 160 made up of nine of the 2D base arrays 150, according to an embodiment.

Figure 2:
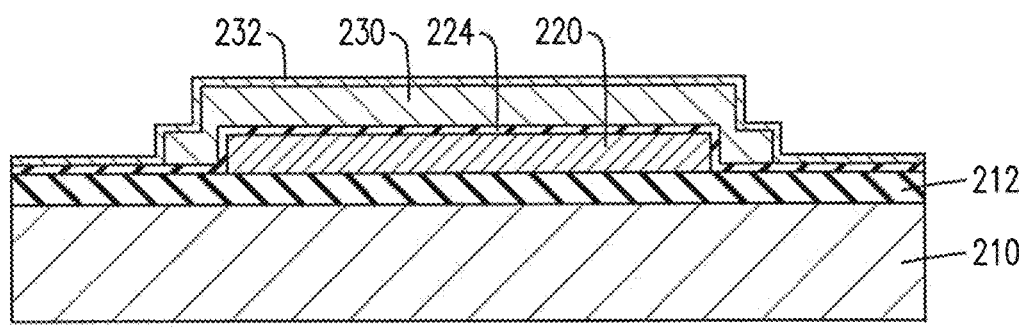
FIG. 2 is a block diagram that illustrates an example stack of layers for an element of a mask array, according to an embodiment.

FIG. 2 is a block diagram that illustrates an example stack of layers for an element of a mask array, according to an embodiment. All depicted non-PCM layers are substantively transmissive in at least a portion of the MWIR to LWIR wavelength range corresponding to the target operating wavelengths. The PCM layer is selectively transmissive in at least that portion of the MWIR to LWIR wavelength range.

The substrate layer 110 in this embodiment includes a handling substrate layer 210 and an electric and thermal insulating layer 212 that are both transmissive in at least a portion of the MWIR to LWIR wavelength range corresponding to the target operating wavelengths. Any such materials with the desired properties can be used, including silicon for layer 210 and silicon dioxide ($SiO_2$) or aluminum oxide ($Al_2O_3$) for layer 212 when operating in the MWIR or zinc sulfide (cleartran) when operating in the MWIR or LWIR.

The hotplate 120 in this embodiment includes electrical resistive material (heater) layer 220 and an electric insulating and thermal spreading layer 224. Any IR transmissive resistive heating material can be used for layer 220. In some example embodiments, the electrical resistive heating material in layer 220 is a silicon-based material selected from a group including n-doped silicon, p-doped silicon, and polysilicon, or some combination.

The electric insulation of layer 224 prevents the voltage applied to drive the heating material layer 220 from causing a current in the PCM layer 230 above. The thermal spreading property of layer 224 allows the heat from the hotplate and PCM layer 230 to dissipate when the hotplate is switched off, and returns the PCM as quickly as possible to unheated ambient temperature. In some embodiments, the material of layer 224 is a dielectric, such as aluminum oxide ($Al_2O_3$, also known as alumina, aloxide and aloxite) or silicon dioxide ($SiO_2$), or ZnS, ZnSe, chalcogenide glasses like Amorphous Material Transmitting IR Radiation (AMTIR) material or some combination.

The phase change material (PCM) layer 130 includes the phase change material in layer 230 and a capping material in layer 232 that is transmissive in the MWIR to LWIR wavelength ranges. Any phase change material can be used that changes absorption (and hence transmittance) in response to one or more temperature changes, including transition metal oxides such as vanadium dioxide ($VO_2$), and chalcogenide-based materials, such as Germanium Antimony (the latter also known as stibium) Tellurium (GST), $Ge_2Sb_2Te_5$. The capping material layer 232 is also often a dielectric, such as aluminum oxide ($Al_2O_3$) or silicon dioxide ($SiO_2$), or some combination.

In some embodiments, additional hotplates are included in the stack, with corresponding electrical resistive heating material layer and electric insulating layer or thermal spreading layers or some combination.

The thickness of the various layers are chosen to meet performance criteria, such as switching time between the two or more states of the PCM and the thermal properties of the other layers. For example, in some embodiments, the electrical/thermal barrier layer 212 is selected to provide the thermal resistance between the patterned Si micro-hotplate layer and the underlying Si substrate 210 to balance the trade-off between heating the PCM to SET and cooling the PCM during RESET. This helps determine the switching speed of the device. The electrical barrier/thermal spreading layer 224 is selected to provide the thermal conductivity to spread the heat generated by the patterned Si micro-hotplate structure 220 to provide uniform heating of the PCM thin film layer 230. The layers are selected to not react with one another or the environment when heated through the phase transition (e.g., up to about 100° C. for $VO_2$). The layers are advantageously designed and operated such that the PCM elements are thermally isolated from one another to prevent cross-talk between adjacent mask elements in the mask array.

Two types of reversible phase change materials (PCMs) that exhibit large changes in index of refraction (n) and in extinction coefficient (k) with thermal cycling are considered in the following example embodiments: (1) chalcogenide-based PCMs such as $Ge_2Sb_2Te_5$ (GST) and (2) transition metal oxide-based PCMs such as $VO_2$. The physical mechanisms responsible for the phase change properties of these PCMs are significantly different from one another, which translates into important differences for mask element fabrication, operation, and scalability.

2. Chalcogenide-Based Embodiments

Chalcogenide-based PCMs are widely used in modern data storage media for rewritable, non-volatile optical and electronic memory. Materials such as GST are designed to undergo reversible amorphous/crystalline phase transitions under optically or electrically induced heating. The phase change produces a large change in the complex refractive index ($\Delta N = \Delta n + i\Delta k$) and electrical resistance. The real part, n, of the complex refractive index is the index of refraction which indicates the ratio of the speed of light in a vacuum to the speed of light in the material; and the imaginary part give the extinction coefficient, k, that is the reciprocal of the distance over which the intensity of a beam of light decays to 1/e of the initial intensity.

Figure 3A:
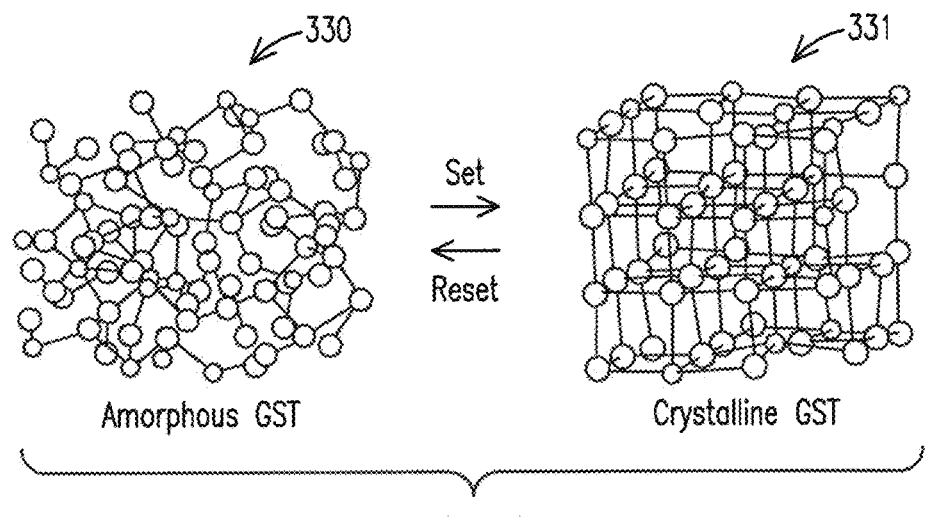
FIG. 3A is a block diagram that illustrates two states of Germanium Antimony (latter also known as stibium) Tellurium, $Ge_2Sb_2Te_5$ (GST) as the PCM, according to an embodiment.

These PCMs have characteristic glass transition temperature Tg and melting temperature Tm typically in the range of about 150° C. and about 600° C., respectively. FIG. 3A is a block diagram that illustrates two states of Germanium Antimony (stibium) Tellurium, $Ge_2Sb_2Te_5$ (GST) as the PCM, according to an embodiment. In the amorphous state 330, GST has low values for the extinction coefficient, k, and is transmissive, allowing MWIR to LWIR radiation to pass with small loss. In the crystalline state 331, GST has high values of k, and blocks radiation in the WMIR to LWIR wavelengths.

Figure 3B:
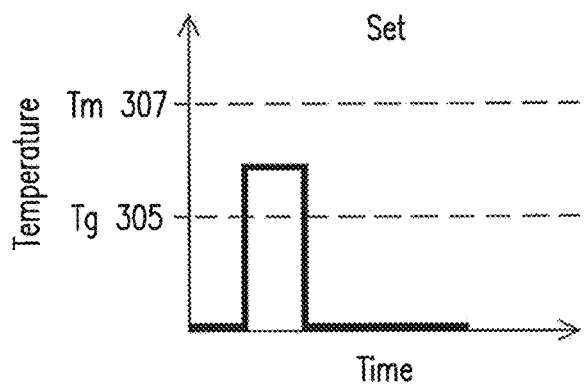
FIG. 3B is a graph that illustrates an example temperature change to change a first state of GST to a second state (set the GST), according to an embodiment.

An initially amorphous GST thin film layer undergoes the following crystallization sequence: amorphous→face-centered cubic (fcc) crystalline (metastable, Tg=160° C.)→hexagonal close packing (hcp) crystalline (stable structure, Tg=370° C.). FIG. 3B is a graph that illustrates an example temperature change to change an amorphous first state of GST to a crystalline second state (SET the GST), according to an embodiment. The horizontal axis is time in arbitrary units, and the vertical axis is temperature in relative units. The glass transition temperature Tg 305 and melting temperature Tm 307 are marked on the temperature axis and by horizontal dashed lines. By heating the material in the amorphous state 330 to a temperature above Tg, a crystalline form results (e.g., above 160° C. for GST fcc, or above 370° C. for GST hcp). The PCM is said to be set to the crystalline, blocking state. Both phases are absorptive, but the hcp phase is more absorptive, transmitting only about one percent at wavelengths from about 3 microns to about 5 microns. The fcc phase transmits about 25% light in the same wavelength range.

Figure 3C:
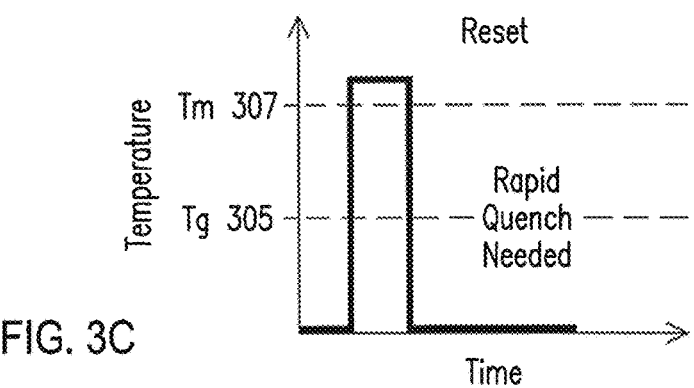
FIG. 3C is a graph that illustrates an example temperature change to change the second state of GST to the first state (reset the GST), according to an embodiment.

The crystallized GST film is reset to amorphous state 330 by heating the film above its melting temperature Tm 307 (e.g., at about 600° C.) and then rapidly cooling (quenching) to below Tg 305 (e.g., 160° C.). FIG. 3C is a graph that illustrates an example temperature change to change the second state of GST to the first state (reset the GST), according to an embodiment. As above, the horizontal axis is time in arbitrary units; and, the vertical axis is temperature in relative units, with Tg and Tm, marked by horizontal dashed lines. The quenching is assisted in some embodiments by a thermal spreading layer 224 of sufficient thickness and thermal conduction. In some embodiments, the thermal spreading layer 224 is thermally connected to a heat sink of some kind, such as a radiator, a cold finger or refrigeration unit.

Once the GST film is switched into either the amorphous or crystalline phase, the PCM material in a mask element remains in the same state without applying an external stimulus (e.g., voltage or additional heating). Therefore, chalcogenide-based PCM devices are non-volatile. The GST mask elements can be set or reset one whole row at a time, with individual mask elements in the row being activated by also activating the corresponding columns. Then the next row is set or reset until all rows are set or reset.

Chalcogenide PCMs are characterized by their nucleation-dominated or growth-dominated crystallization behavior. In nucleation dominated materials such as GST, the crystallization rate depends on several properties, including the crystallization temperature, crystal nucleation and growth rate, and the incubation time between the start of heating and the formation of crystalline nuclei. The transition from the crystalline to the amorphous phase requires a rapid cooling rate of about $10^{10}$ Kelvin per second (K/s). It has been shown that optically induced amorphous→crystalline→amorphous switching speed of 100 nanometers (nm, 1 nm=$10^{-9}$ meters) diameter features in sub-100 nm thick GST films is less than 20 nanoseconds (ns, 1 ns=$10^{-9}$ seconds) for structures that include metallic heat conducting layers.

In some embodiments, the switching speeds of micron-sized, greater than 200 nm-thick, optically transmissive masking elements have been determined, which are limited by the heating and cooling rate of an electrically addressed Si-based micro-hotplate.

Figure 4A:
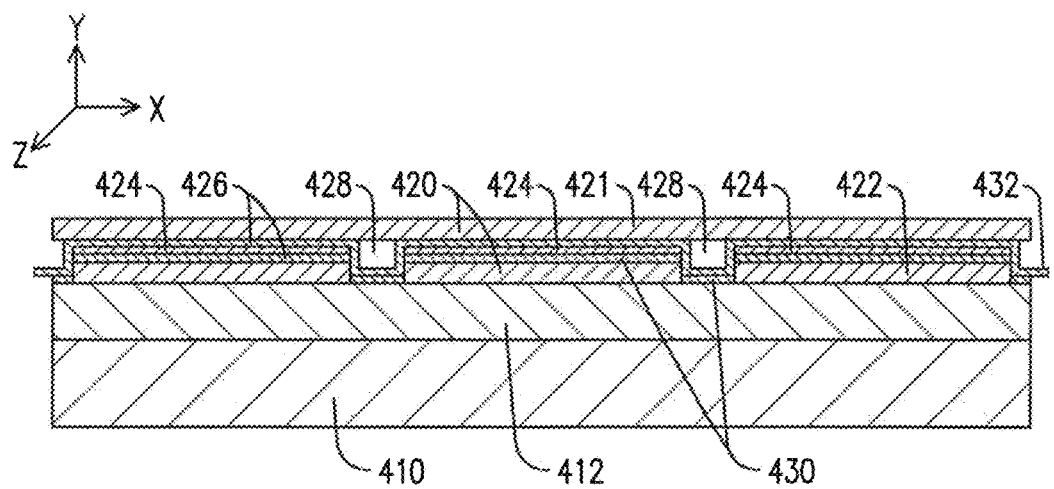
FIG. 4A is a block diagram that illustrates an example stack of layers for GST-based elements of a mask array, according to an embodiment.

In these embodiments, the masking element includes a 10 micron wide heating element extending in one direction below the GST layer, and a 10 micron wide heating element extending in a perpendicular direction above the GST layer. FIG. 4A is a block diagram that illustrates an example stack of layers for GST-based elements of a mask array, according to an embodiment. The directions are indicated by the x, y and z axes, where x is directed left to right in the diagram, y is directed bottom to top in the diagram, and z is directed out of the page. Substrate layer 110 includes a Si substrate 410 capped by a $SiO_2$ layer 412. The bottom heater 422 comprises n doped Silicon (n+ Si) as the electrical resistive heating material in multiple separate strips parallel to the z axis in the xz plane. The strips are coated with an electrically insulating material, such as $Al_2O_3$ or $SiO_2$ as one of the dielectric layers 426. GST material is deposited across all strips and the gap between strips, with the portion above the heating strips serving as GST switching layer 430. The GST layer is coated with an electrically insulating material, such as $Al_2O_3$ or $SiO_2$ as the second of the dielectric layers 426. A barrier is formed in the gaps between the lower strips, which physically isolates separate GST elements. The top heater 421 is deposited on the upper insulating dielectric 426 and comprises n doped Silicon (n+ Si) as the electrical resistive heating material in multiple separate strips parallel to the x axis in the xz plane. Not shown is a 20 nm capping layer of $Al_2O_3$.

Figure 4B:
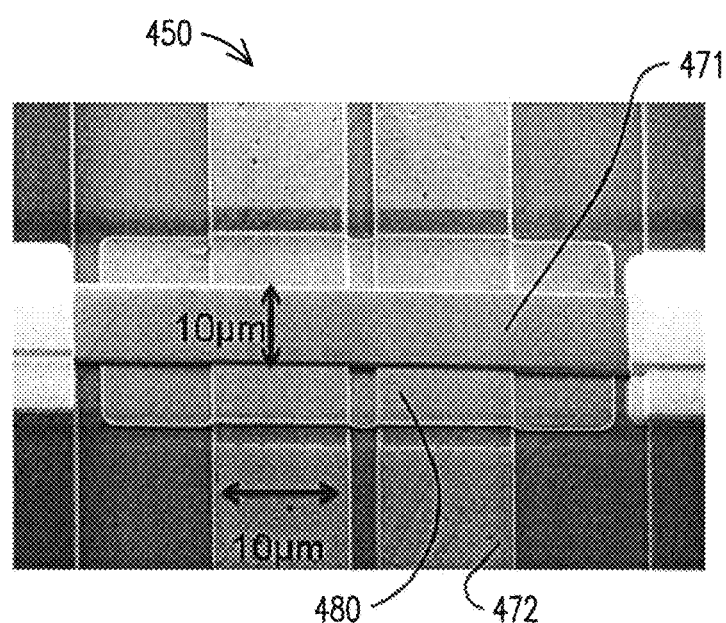
FIG. 4B is an image that illustrates an example pattern of layers for GST-based elements of a mask array, according to an embodiment.

FIG. 4B is an image 450 that illustrates an example pattern of layers for GST-based elements of a mask array, according to an embodiment. Image 450 is taken by a scanning electron microscope and shows an array of two masking elements, comprising two bottom heaters 472 of width 10 microns running along the z axis in the xz plane, a GST layer 480 to form two switching PCM elements, and a single top heater 471 of width 10 microns running along the x axis in the xz plane.

Set times depend on the crystallization kinetics of GST. Crystallization speed can be improved by: adjusting the thermal properties of the stack (e.g. resistance, heat capacity, thermal conductivity); or, modifying the PCM composition to favor rapid nucleation and growth at lower temperatures, or some combination. Reset requires sufficient heating to exceed the melting temperature, Tm (about 600° C. for GST). In an example embodiment, one heater (e.g., the bottom heater) alone was not sufficient to reach Tm; both top heater 421 and bottom heater 422 had to be on to melt the GST crystalline state 431 and regenerate the amorphous state 430. Thus, in this embodiment, when one bottom heater and the top heater are both on, the one 10 micron×10 micron PCM element between both is reset to the amorphous state.

3. Transition Metal-Oxide Based Embodiments

Figure 5A:
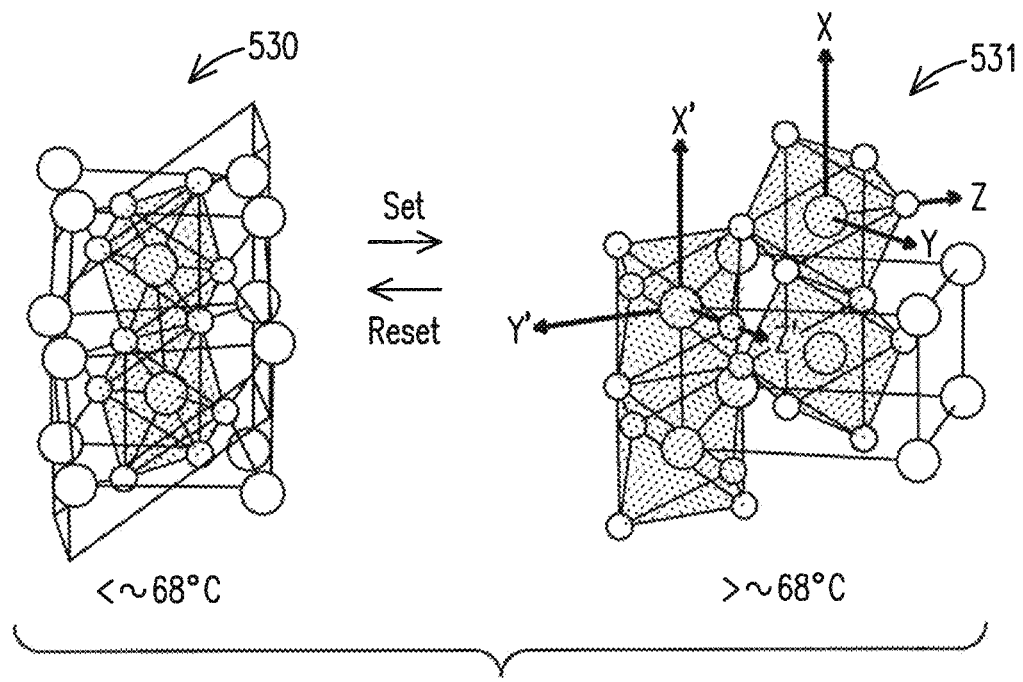
FIG. 5A is a block diagram that illustrates two states of vanadium dioxide ($VO_2$) as the PCM, according to an embodiment.

Transition metal oxide-based PCMs such as vanadium dioxide ($VO_2$) exhibit a metal-insulator phase transition (MIT) that also results in a large change in the complex refractive index ($\Delta N=\Delta n+i\Delta k$) and electrical resistance. In contrast to chalcogenide-based PCMs, $VO_2$ undergoes a structural phase transformation from a low-temperature monoclinic phase to a high-temperature tetragonal rutile phase. FIG. 5A is a block diagram that illustrates two states of vanadium dioxide ($VO_2$) as the PCM, according to an embodiment. The monoclinic (M1) crystalline state 530, and rutile (R) crystalline state 531 are the end point phases of $VO_2$. The unit cells indicate the effective doubling of the M1 cell compared to the R phase. In the monoclinic crystalline state 530, $VO_2$ has low values for the extinction coefficient, k, and is transmissive, allowing MWIR to LWIR radiation to pass with small loss. In the rutile crystalline state 531, $VO_2$ has high values of k, and blocks radiation in the WMIR to LWIR wavelengths.

Figure 5B:
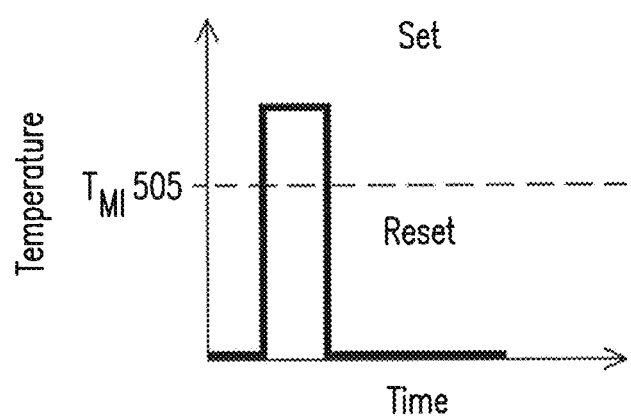
FIG. 5B is a graph that illustrates an example temperature change to change from a first state of $VO_2$ to a second state of $VO_2$ (set) and back (reset), according to an embodiment.

The fully reversible phase transformation occurs at about 68° C. for $VO_2$. It has been shown that the structural phase transition is ultrafast, occurring on a picosecond (ps, 1 ps=10-12 seconds) time scale. In contrast to chalcogenide PCMs, the temperature of MIT PCMs such as $VO_2$ must be maintained above the transition temperature to remain in the metallic phase. When the temperature drops below the transition temperature, the material returns to the insulating phase. This passive reset makes $VO_2$ an attractive candidate for reconfigurable optical devices such as the masking arrays described herein. However, to set an individual mask element, the mask element uses its own circuit and is not set sharing a circuit with a whole row (or column) at a time, as can be done with a non-volatile PCM, like GST described above. FIG. 5B is a graph that illustrates an example temperature change to change from a first state of $VO_2$ to a second state of $VO_2$ (set) and back (reset), according to an embodiment. The horizontal axis is time in arbitrary units; and, the vertical axis is temperature in relative units. The monoclinic transition temperature $T_{MI}$ 505 is marked on the temperature axis and by a horizontal dashed line.

In the following experimental embodiments, $VO_2$ thin films were formed using a two-step process: (1) pulsed DC reactive magnetron sputtering of a $VO_x$ film; and (2) thermal anneal in $Ar/O_2$ to convert the as-deposited $VO_x$ film into a single phase $VO_2$ film. The conversion process from $VO_x$ to $VO_2$ is sensitive to the annealing temperature and $Ar/O_2$ ratio and flow rate because variations in these parameters can lead to the formation of other metastable phases, including $V_2O_5$ and $V_6O_{13}$ phases. The higher temperature anneals result in mixed-phase films, which do not have phase change properties as compared to the single phase film. The condition that resulted in single phase $VO_2$ thin films was used for the discrete mask elements and mask array devices described herein. It has been shown that the process conditions used to obtain the highest quality $VO_2$ films depend on both the film thickness and substrate.

A conformal environmental barrier/encapsulation is advantageously integrated on the deposited $VO_2$ film to maintain its long-term stability against oxidation to other metastable phases such as $V_2O_5$ and $V_6O_{13}$. To meet this goal, a low-temperature atomic layer deposition (ALD) process was developed to encapsulate the $VO_2$ thin film with a conformal alumina ($Al_2O_3$) coating layer. Suitable process parameters were identified using X-ray diffraction (XRD) to observe the phases present in the $VO_2$ film before and after ALD. The following ALD conditions were found to maintain the phase purity of the starting $VO_2$ thin films: inject alternating 15 millisecond (ms, 1 ms=$10^{-3}$ seconds) pulses of trimethylaluminum (TMA) and $H_2O$; separate precursor pulses by 45 s to remove the non-reacted precursors and the gaseous reaction by-products; substrate temperature 100° C. These conditions deposit about 0.09 nm of $Al_2O_3$ per cycle.

Thicker $VO_2$ layers are advantageous for optimized IR mask element design, as described in more detail below. Film thicknesses in the order of 500 nm are desired to achieve the desired optical performance. Thus, as part of the $VO_2$ deposition optimization process, thicker films have been deposited. A scanning electron microscope (SEM) micrograph evidenced a 230 nm thick $VO_2$ film and the corresponding XRD data showed single phase $VO_2$.

Figure 5C:
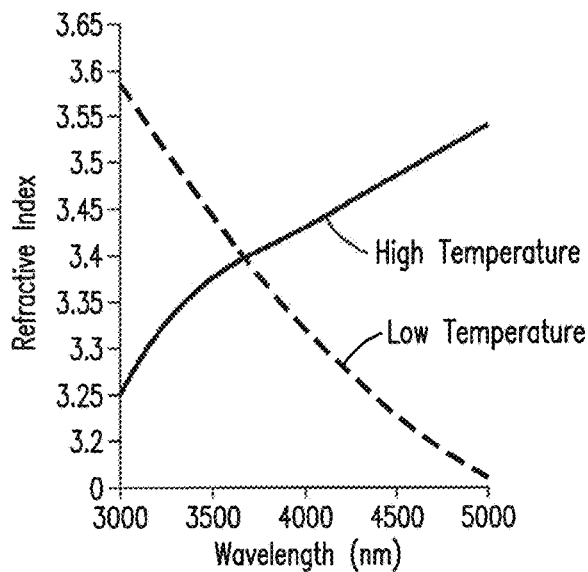
FIG. 5C is a graph that illustrates example dependence of refractive index for $VO_2$ on wavelength for the two states, according to an embodiment.
Figure 5D:
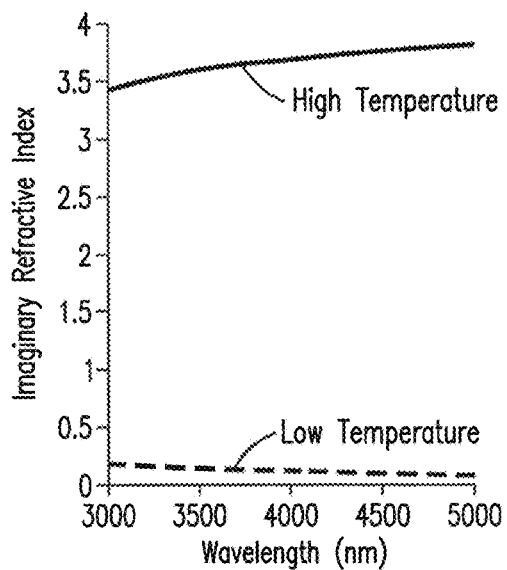
FIG. 5D is a graph that illustrates example dependence of absorption (imaginary refractive index) for $VO_2$ on wavelength for the two states, according to an embodiment.

$VO_2$ films exhibit extraordinary changes in optical properties changes between the low-temperature insulating and high-temperature metallic phases. FIG. 5C and FIG. 5D show the refractive index (n) and extinction coefficient (k) for $VO_2$ reported by Verleur et al., "Optical Properties of $VO_2$ between 0.25 and 5 eV," Physical Review, v172, n3, pp 788-798, 15 Aug. 1968. FIG. 5C is a graph that illustrates example dependence of refractive index for $VO_2$ on wavelength for the two states, according to an embodiment. The horizontal axis is wavelength in nanometers; and, the vertical axis is refractive index n, which is dimensionless. One trace shows the refractive index at low temperature first state (reset) and the other trace shows the refractive index at high temperature second state (set). FIG. 5D is a graph that illustrates example dependence of extinction coefficient for $VO_2$ on wavelength for the two states, according to an embodiment. The horizontal axis is wavelength in nanometers; and, the vertical axis is extinction coefficient, which is dimensionless. One trace shows the extinction coefficient at low temperature first state (reset) and the other trace shows the refractive index at high temperature second state (set). The large difference in n and k results in a change in the transmission/reflection properties of the structure, showing high transmission in the insulating state (<65° C.) and low transmission in the metallic state (>70° C.).

Figure 6:
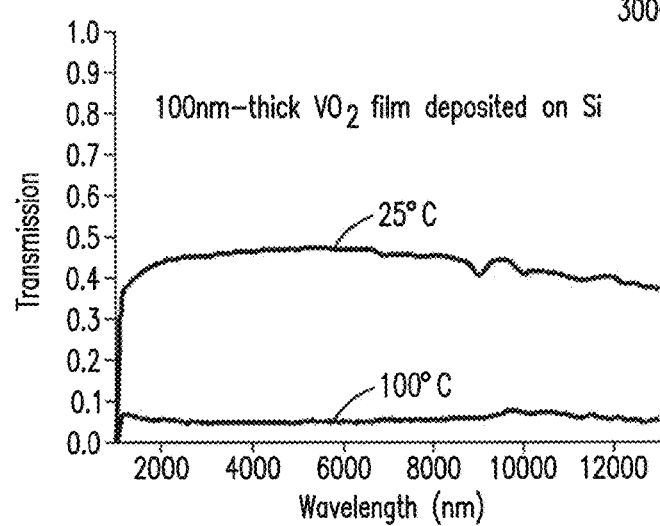
FIG. 6 is a graph that illustrates example transmission of a 100 nanometer thick layer of $VO_2$ for IR wavelengths at the temperatures associated with the two states, according to an embodiment.

FIG. 6 is a graph that illustrates example transmission of a 100 nanometer thick layer of $VO_2$ for IR wavelengths at the temperatures associated with the two states, according to an embodiment. The horizontal axis is wavelength in nanometers; and, the vertical axis is transmission fraction through the layer, dimensionless. The 100 nm-thick $VO_2$ film (without antireflective coating) is deposited on a Si substrate in this embodiment. The low-temperature insulating phase at room temperature is transmissive throughout the MWIR while the high-temperature metallic phase attenuates the incident light.

The phase transition of $VO_2$ thin films deposited on planar Si substrates was also characterized by measuring the sheet resistance of a 100 nm-thick $VO_2$ film from 25° C. up to 100° C. in some embodiments. The sheet resistance versus temperature was measured by ramping the temperature of the $VO_2$ film at a rate of ±5° C./min. The sheet resistance begins at a high value of 380 kilo Ohms (kΩ, 1 kΩ=103 Ohms, also designated kiloOhms per square, KΩ/, for sheet resistance) at room temperature (insulating phase) and decreases down to 4 KΩ/(metallic phase) at 100° C. The transition between the two phases occurs over a 30° C. range between temperatures of 55 and 85° C. These films exhibit a large insulating-metallic phase sheet resistance ratio of 100, which is comparable to the best $VO_2$ films of this thickness presented in the literature. The optical contrast (visible) of the film was also monitored as the electrical properties were collected. As anticipated, these measurements confirmed that the optical attenuation (absorption) increases as the film transitions from the insulating phase to the metallic phase.

Figure 7A:
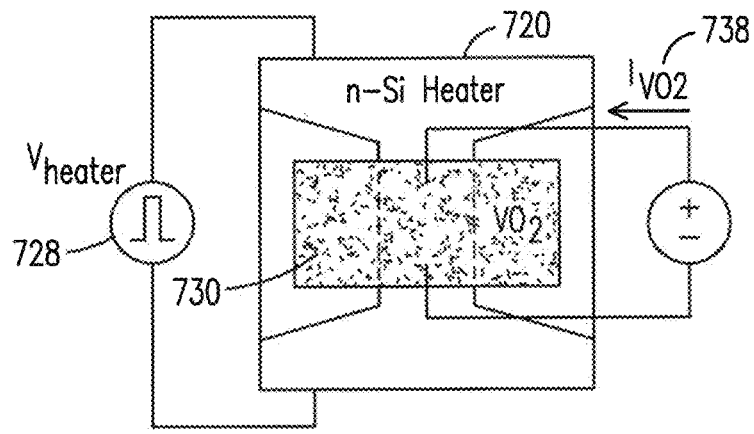
FIG. 7A is a block diagram that illustrates an example mask element based on $VO_2$, according to an embodiment.
Figure 7B:
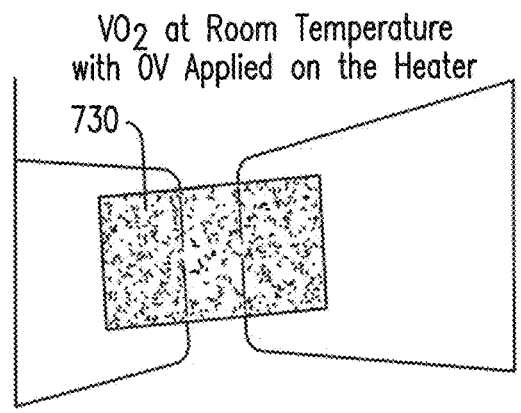
FIG. 7B is an image that illustrates example transmissive state for the mask element of FIG. 7A, according to an embodiment.
Figure 7C:
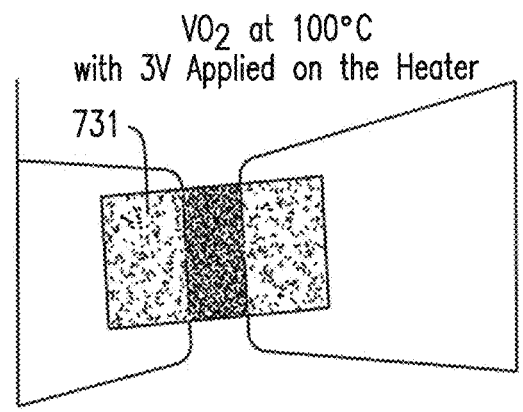
FIG. 7C is an image that illustrates example blocking state for the mask element of FIG. 7A, according to an embodiment.

Individual mask element test structures shown in FIG. 2 were fabricated and characterized as a proof-of-concept for the electrically addressable micro-hotplate device architecture. FIG. 7A is a block diagram that illustrates an example mask element based on $VO_2$, according to an embodiment. The n+ doped Si material heater 720 is in thermal contact with a $VO_2$ layer 730 across a dielectric layer and is biased by a heater voltage Vheater 728. The electrical pulsed bias voltage 728 is applied across the 10 μm-wide, 300 nm-thick $n^+$-Si micro-hotplate, which has a total resistance of about 200 f. Electrical measurements of the state of the $VO_2$ material was determined by measuring a current $I_{VO2}$ through the material as a result of an applied voltage. FIG. 7B is an image that illustrates example transmissive state for the mask element of FIG. 7A, according to an embodiment. FIG. 7C is an image that illustrates example blocking state for the mask element of FIG. 7A, according to an embodiment.

Figure 8A:
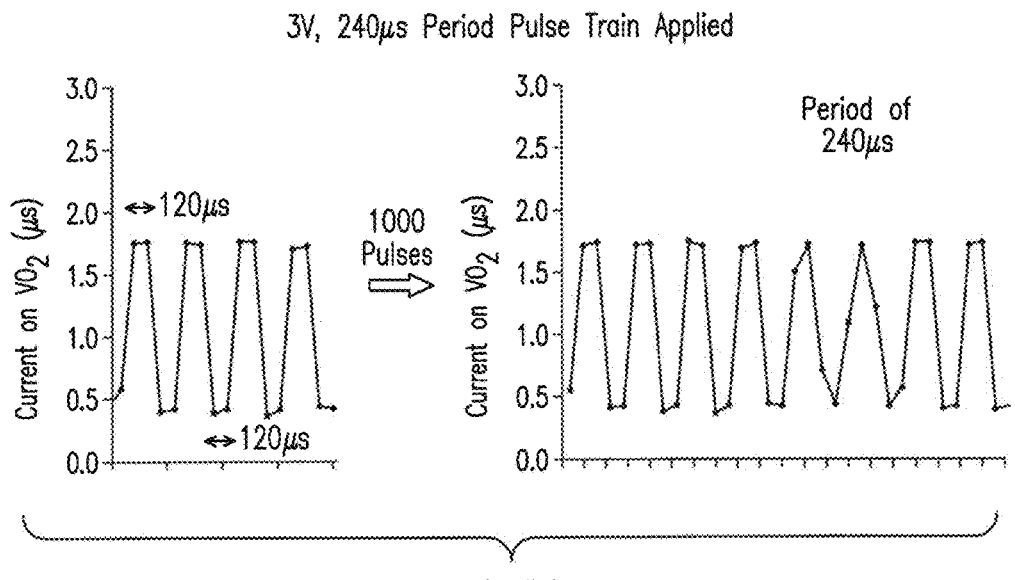
FIG. 8A is a graph that illustrates example temporal response to a first pulse rate for a mask element, according to an embodiment.
Figure 8B:
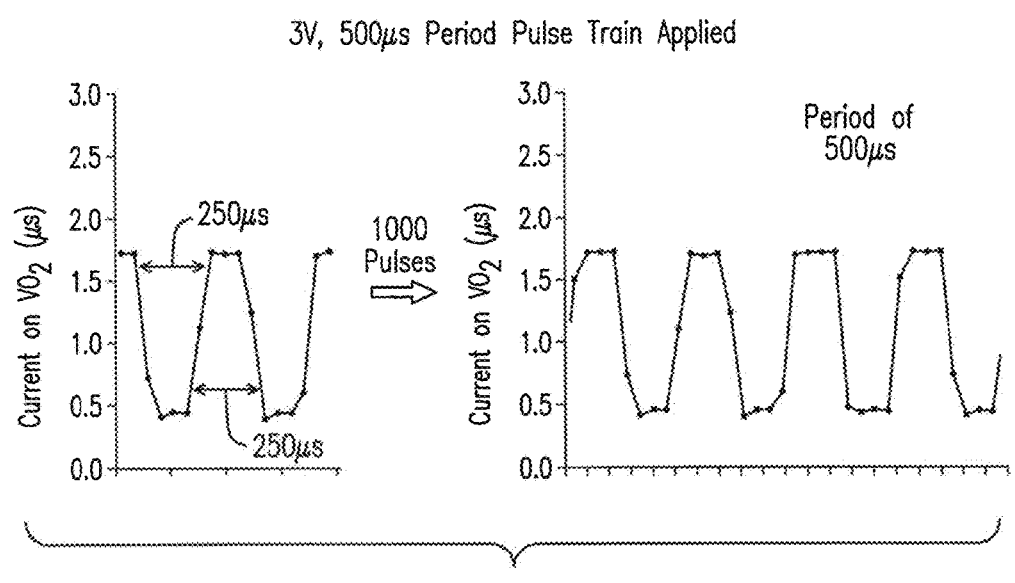
FIG. 8B is a graph that illustrates example temporal response to a second pulse rate for a mask element, according to an embodiment.

These initial switching measurements were done in air and with the back of the Si substrate held at 25° C. Under these conditions, a 3V bias pulse provides sufficient joule heating to fully switch the meta-pixel from the insulating to the metallic phase in <100 microseconds ($\mu s$, 1 $\mu s=10^{-6}$ seconds). FIG. 8A is a graph that illustrates example temporal response to a first pulse rate (120 $\mu s$) a mask element, according to an embodiment. The horizontal axes indicate time in 50 $\mu s$ per tick; and the vertical axis is $I_{VO2}$ in micro-Amperes ($\mu A$, 1 $\mu A=10^{-6}$ Amperes). FIG. 8B is a graph that illustrates example temporal response to a second pulse rate (250 $\mu s$) for a mask element, according to an embodiment. The axes are as in FIG. 8A.

This switching speed is limited by the experimental test setup used for this initial measurement. A later section presents the results of high-speed optical testing, which provides a more accurate measurement of the fundamental switching speed of the current device structure. The minimum experimental switching time recorded, which was required to switch the mask element, was 25 $\mu$sec, which was limited by the integration time of the high speed camera used for the measurements. Thermal analysis, as is shown below, predicts a minimum switching time of about 0.15 $\mu$sec. Also, a >2.5V input voltage was shown to switch the $VO_2$ element. Notably, no degradation was observed in the reversible switching response after thousands of switching cycles.

The thermal response of the mask element was analyzed to evaluate the time required to heat the structure through the phase-transition and back again. A 2×2 mask array was created using Patran 2012 with a set of 3D elements to mesh the layers in the model. The model incorporates the thermo/electrical properties of the $VO_2$ thin film in the insulating and metallic phases. Consequently, each layer was assigned a specific heat capacity, thermal conductivity and density specific to the material properties, as described in Table 1.

TABLE 1

Example Physical Properties of Various Materials Used in a Stack of Layers for a Masking Element, According to Thermal Analyses of Various Embodiments

| material | conductivity α (S/m) | heat capacity Cp (J/kgK) | thermal conductivity K (W/mK) | thermal expansion coefficient α ($10^{-6}$/k at 20 C.) | density ρ(g/cm$^3$) |
|---|---|---|---|---|---|
| $Al_2O_3$ | NA | 880 | 18 | 8.1 | 3.69 |
| $SiO_2$ | NA | 670-740 | 1.46 | 0.59 | 2.65 |
| n-Si | $1.2 \times 10^5$ | 680 | 100~190 | 3 | 2.23 |
| a-GST | 3 | 202 | 0.2 | 13.3 | 5.87 |
| c-GST | 2770 | 202 | 0.5 | 17.4 | 6.27 |
| $VO_2$(RT) | ~100 | 644 | 6 | 6.4 | 4.57 |
| $VO_2$(120 C.) | $~5 \times 10^5$ | 788 | 3.5 | 17.1 | 4.65 |

A voltage of 4.0 volts and 6.0 Volts was applied to the micro-heater layer (n-Si, thickness=0.30 $\mu m$) in order to generate a heat load beneath the element ($VO_2$, thickness=0.1 $\mu m$) of 0.126 Watts and 0.284 Watts, respectively. Only one element was assumed to be active.

The sheet resistance data shows that the $VO_2$ film should be fully switched into the metallic phase when its temperature exceeds 85° C. It was determined that 150 nanoseconds (ns, 1 ns=$10^{-9}$ seconds) after a 4V pulse is applied to the micro-hotplate, the temperature of the $VO_2$ film reaches 121° C. The pixel rapidly returns to room temperature approximately 5 $\mu s$ after the bias is removed. It was further demonstrated that the time required to reach 125° C. can be reduced to below 70 ns by increasing the applied bias from 4V to 6V. The cooling rate remains approximately 5 $\mu s$.

This modeling predicts that fast switching times can be achieved with the $VO_2$ based pixels. These values are considerably faster than the 32 kHz sampling modulation of the digital mirror arrays (DMA) that are currently available.

High speed switch properties were characterized on the same mask array devices by measuring the change in optical response using a high-speed camera sensitive in the visible. It should be noted that this experimental setup only provides data relevant to switching speed and not optical performance because the optical contrast is much lower in the visible as compared to the MWIR. Ongoing work is evaluating the MWIR the transmission and attenuation as a function of micro-hotplate temperature.

Figure 10:
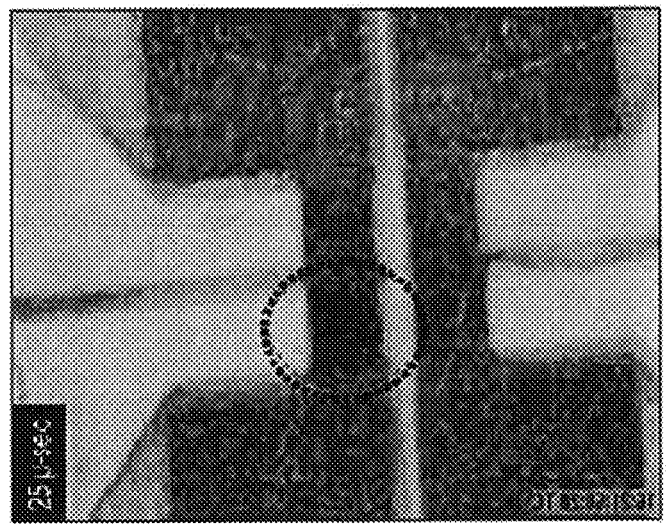
FIG. 10 is an image that illustrates example transmission through the heated $VO_2$ element of the 2×2 element array, according to an embodiment.
Figure 9:
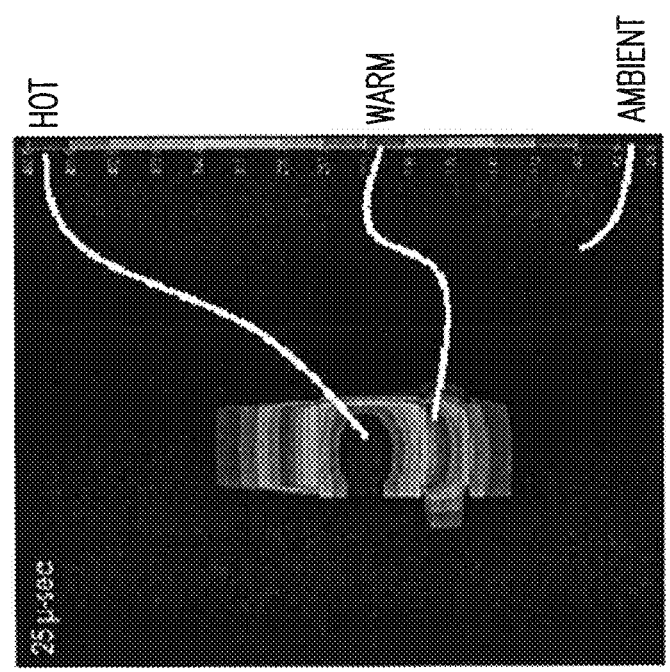
FIG. 9 is an image that illustrates example computed temperature distribution around a heated $VO_2$ element of a 2×2 element array, according to an embodiment.

FIG. 9 is an image that illustrates example computed temperature distribution around a heated $VO_2$ element of a 2×2 element array, according to an embodiment. FIG. 10 is an image that illustrates example transmission through the heated $VO_2$ element of the 2×2 element array, according to an embodiment. The integration time of the high speed camera used in these experiments limited the switching speed to 25 $\mu$sec. FIG. 10 shows a single frame image collected when a bias was applied to the pixel in the upper left hand corner of an individually addressable 2×2 pixel array. The pixel is switched from the insulating (optically transmissive) to the metallic (optically opaque) phase by applying a 4V, 25 $\mu$sec bias pulse. These high-speed switching measurement results agree well with the thermal modeling that was conducted on these samples. A complete video file of the meta-pixel switching response measured by applying a 4 V, 25 $\mu$sec pulse train was obtained. At a 6V and 125 $\mu s$ pulse period, cross-talk between adjacent pixels is observed. Again, the thermal analysis and experimental data show excellent agreement.

Using the n and k values shown in FIG. 5C and FIG. 5D, the $VO_2$ stack structure was optimized to provide the desired properties throughout the MWIR. Table 2 illustrates example transmission and reflectance a $VO_2$ element, according to an embodiment.

TABLE 2

Simulation of Optimized Stack

| | High temp | Low temp |
|---|---|---|
| Average transmission | 0.1% | 70.0% |
| Average reflection | 34.1% | 8.9% |

Table 3 illustrates materials and thicknesses of a stack of layers for a masking element, according to an embodiment.

TABLE 3

Materials and Thicknesses of Layers for a Masking Element

| Material | Thickness |
|---|---|
| $SiO_2$ | 550 nm |
| $Al_2O_3$ | 20 nm |
| $VO_2$ | 600 nm |
| $Al_2O_3$ | 20 nm |
| n + α-Si | 100 nm |

TABLE 3-continued

Materials and Thicknesses of
Layers for a Masking Element

| Material | Thickness |
|---|---|
| $SiO_2$ | 100 nm |
| Si (substrate) | 500 μm |
| $(Si/SiO_2$ or $Si_3N_4)$ n = 1.85 | 550 nm |

A target performance for some embodiments calls for the mask elements to switch between a highly transmissive state with >80% throughput and a non-transmissive state with >99.9% optical rejection. The optimized design shows a $VO_2$ layer thickness of 600 nm, providing an average transmission throughout the MWIR of 70% for the low temperature phase, and 0.1% throughout (99.9% rejection) for the high temperature phase. Although the target >80% ON transmission value has not been met with this design, 70% was met. Other design architectures can be explored to achieve the 80% value. A tradeoff is anticipated between the ON/OFF state throughput. An average of 70% throughput is achieved in ON state and 0.1% throughput (i.e. 99.9% rejection) is achieved in the OFF state throughout the MWIR region.

The MWIR properties of the fabricated 2×2 arrays were also measured using a blackbody as the source and an InSb camera as the detector 182. A 36× reflective objective was used to image the devices. Measurements were taken over temperature (10° C. to 50° C.) and voltage (0V to ~3V).

Two candidate resistive micro-hotplate materials were evaluated in various embodiments: (1) doped Si and (2) indium tin oxide (ITO). These were selected because of their stability at high operating temperatures (>100° C.), low resistivity, high thermal conductivity, and MWIR transparency. Table 1 summarizes the relevant properties of these resistive materials along with the substrate, barrier, and capping layers. Both the doped-Si and ITO heater materials provided the desired thermal and operating stability advantageous for the $VO_2$-based mask elements. However, ITO has significantly higher MWIR loss, which limited the maximum optical transmission. Therefore, doped Si was down-selected for the proof-of-concept mask array demonstration devices. This doped Si can be replaced with doped poly-Si when the mask element structure is monolithically integrated onto a Si CMOS integrated circuit.

Two different electrical barrier/heat spreading layers were also evaluated: (1) $SiO_2$ and (2) $Al_2O_3$. Table 1 shows that the thermal conductivity of $SiO_2$ is considerably lower than $Al_2O_3$. Pixels fabricated using $SiO_2$ showed non-uniform heating across the micron-sized pixel due to its poor thermal conductivity. Therefore, $Al_2O_3$ was down-selected for this layer. As discussed in Section 2.1, $Al_2O_3$ was also used for the top-most encapsulation layer.

4. Individual Addressing

Individually addressable 2×2 and 4×4 meta-pixel arrays were also included to study array switching properties and thermal cross-talk.

For a fabricated 2×2 array, a 0V to 6V 250 μsec period square pulse train was applied to the mask element. At input voltages of <4V, only one pixel switches from its insulating to a metallic state, while at voltages >4V, cross-talk is evident between the two adjacent pixels, so the temperature is sufficient for both pixels to turn on. This is confirmed by the thermal analysis.

Figure 11:
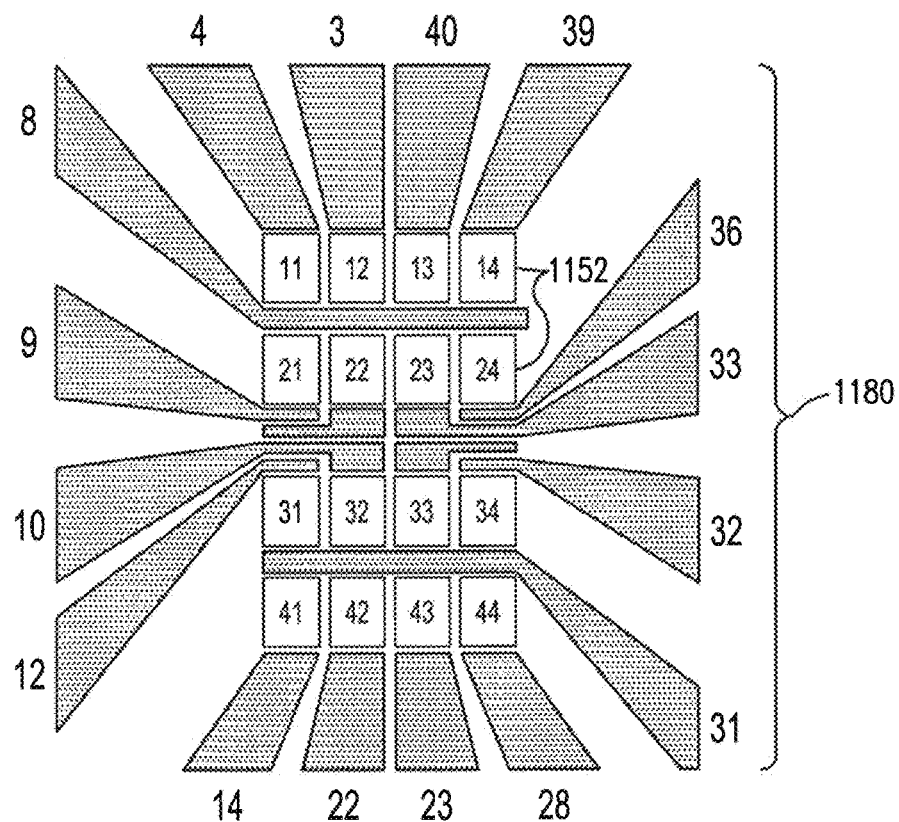
FIG. 11 is a block diagram that illustrates individually addressable masking elements in a 4×4 array of masking elements, according to an embodiment.

FIG. 11 is a block diagram that illustrates individually addressable masking elements 1152 in a 4×4 array of masking elements, according to an embodiment. The layout illustrates the electrical contact pin number label associated with the wiring of the device. As an example, applying a 3V bias pulse between electrical contacts 1180 labeled 8 and 9 on the 4×4 array will locally heat mask element 21, switching it from the transmissive (insulating) to absorbing (metallic) state. These devices were wire bonded and switching of each pixel was observed with high speed camera to experimentally monitor cross-talk between adjacent pixels.

The input voltage applied was 2.5V. For example, pixel 11 was switched by applying 2.5V on pin 8 and 4. Pixels 34 and 44 were switched simultaneously by applying 2.5V on pin 28 and 32, and so forth. The results show that no cross-talk is observed between adjacent pixels at a 2.5V input voltage, as predicted by the thermal simulations. Additional tests are advantageous for higher voltages, since the higher the voltage the shorter the switching time required, although there will be a tradeoff between voltage and adjacent pixel cross-talk. These results provide good evidence of controllable individual pixel switching for the aperture mask.

More scalable individual addressing is possible with more sophisticated circuitry. It is envisioned that such circuitry is combined with the mask array fabrication using integrated circuits (IC) in some embodiments. Thus array integration onto a complementary metal-oxide-semiconductor (CMOS) drive and control circuit IC is described here.

Figure 12:
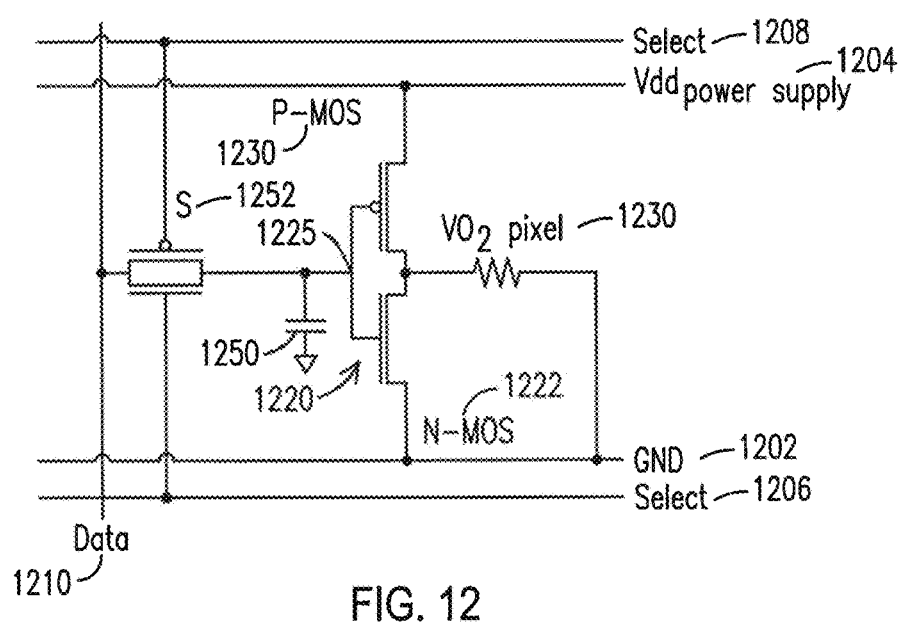
FIG. 12 is a block diagram of a circuit for individually driving a heating element for a $VO_2$-based masking element in an arbitrary array of such elements, according to an embodiment.

FIG. 12 is a block diagram of a circuit for individually driving a heating element for a $VO_2$-based masking element in an arbitrary array of such elements, according to an embodiment. This circuit is based on Jared et al. (Ref: D. Jared et al., "Electrically addressed spatial light modulator that uses a dynamic memory," Optics Lett. 16 (22) 1991), which described a design that is comparable to the envisioned individual mask element driver circuit design. The select bar line 1208 and data line 1210 are used to set the state of each storage capacitor 1252 on a row-by-row basis. The charge stored on the capacitor (or no charge) sets the state of the input inverter 1225 to a high or low. If the state is low, the PMOS transistor (p-channel MOS) 1224 turns ON (with n-channel MOS (NMOS) 1222 OFF) and connects the $V_{DD}$ power supply 1204 to the output node of the inverter 1220. In this case, there is a voltage drop across the resistive heater, and the $VO_2$ pixel 1230 will be in the metallic phase. On the other hand, if the state is high (capacitor charged), the NMOS transistor 1222 turns ON (PMOS 1224 OFF) and connects GND 1202 to the output node of the inverter 1220. In this case, there is no voltage drop across the pixel, and the $VO_2$ pixel 1230 will be in the insulating phase.

Figure 13:
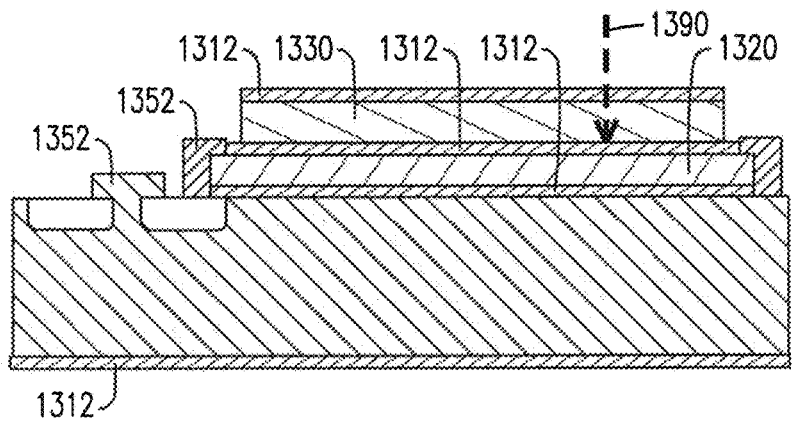
FIG. 13 is a block diagram that illustrates example integrated circuit components for a control circuit monolithically formed with a masking element, according to an embodiment.

FIG. 13 is a block diagram that illustrates example integrated circuit components for a control circuit monolithically formed with a masking element, according to an embodiment. The mask element stack including AR dielectric coatings 1312 sandwiching a PCM layer 1330 and micro-hotplate 1320 is formed on the same IR transmissive substrate 1310 as Si CMOS components 1350, connected by electrical conductors 1352. CMOS implementation provides a scalable manufacturable process that facilitates the full mask array fabrication and integration.

Such an integrated device is straightforward to manufacture, and involves low switching voltages to address the individual pixels. This architecture minimizes dead space between adjacent mask elements. The design involves a single micro-hotplate, which makes easier the design of the optical properties. Low switching temperature (<100° C.) minimizes thermal cross-talk between adjacent pixels.

Figure 14A:
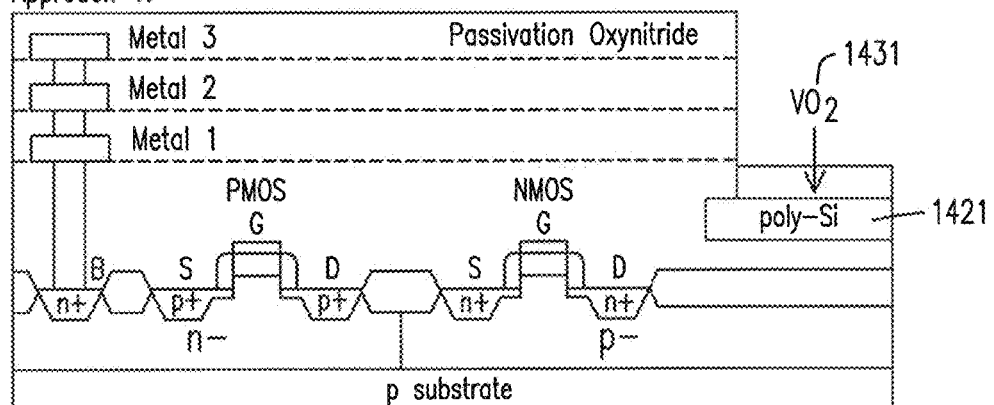
FIG. 14A is a block diagram that illustrates an example integrated circuit for a control circuit monolithically formed between $VO_2$-based masking elements, according to one embodiment.
Figure 14B:
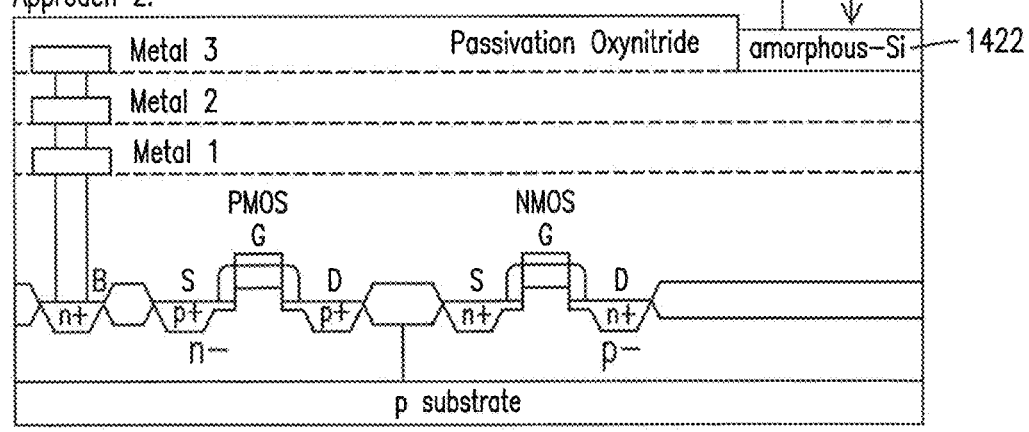
FIG. 14B is a block diagram that illustrates an example integrated circuit for a control circuit monolithically formed between $VO_2$-based masking elements, according to another embodiment.

Two approaches have been identified for the integration of the mask element onto the CMOS drive and control circuit, as illustrated in FIG. 14A and FIG. 14B. FIG. 14A is a block diagram that illustrates an example integrated circuit for a control circuit monolithically formed between $VO_2$-based masking elements, according to one embodiment. The approach of FIG. 14A uses a poly-Si micro-hotplate 1421 integrated during MOSIS CMOS front-end fabrication, with $VO_2$ material layer 1431 deposited thereon. The circuitry of FIG. 12 involves various components, including capacitor 1250, storage capacitor 1252, P_MOS transistor 1230 and N-MOS transistor 1222, and conductors for various lines, including 1202, 1204, 1206 and 1208. These devices can be formed monolithically by layering CMOS materials with different carriers, such as n−, p−, n+ and p+ and metal 1, 2 and 3, as depicted in FIG. 14A.

FIG. 14B is a block diagram that illustrates an example integrated circuit for a control circuit monolithically formed between $VO_2$-based masking elements, according to another embodiment The approach of FIG. 4B uses an poly-Si micro-hotplate 1422 and $VO_2$ material layer 1432 integrated after MOSIS CMOS front-end fabrication is complete. The main different between these two approaches is that in FIG. 14A the element is etched all the way to the poly-Si layer on the CMOS IC to make the contract, while in FIG. 14B a top poly-Si layer is deposited. Both process integration approaches can be tested using the same MOSIS CMOS chip layouts for rapid and cost-effective advances in TRL/MRL of the monolithically integrated mask array design. As in FIG. 14A, the circuitry of FIG. 12 is formed monolithically by layering CMOS materials with different carriers, such as n−, p−, n+ and p+ and metal 1, 2 and 3.

Figure 15:
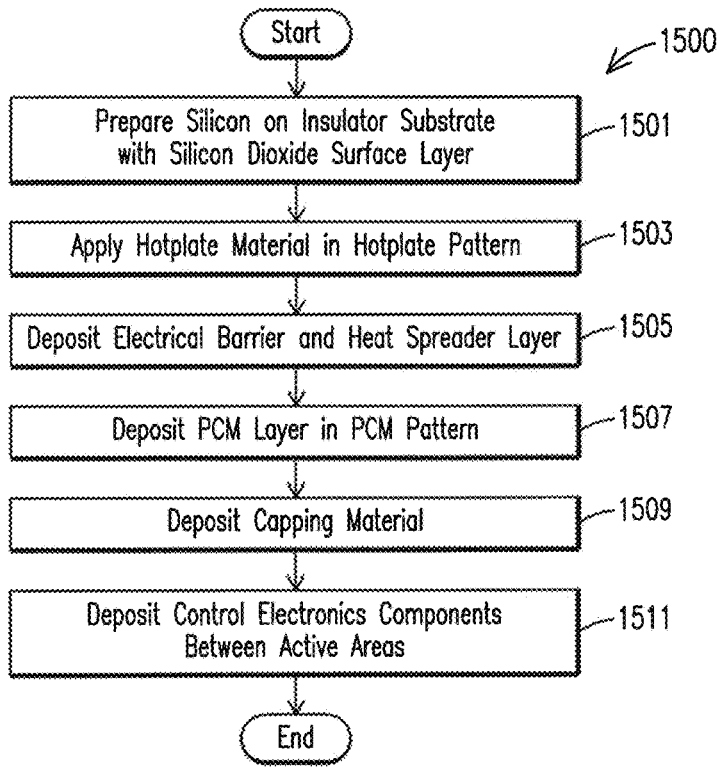
FIG. 15 is a flow diagram that illustrates an example method for constructing an individual addressable mask array, according to an embodiment.

FIG. 15 is a flow diagram that illustrates an example method 1500 for constructing an individual addressable mask array, according to an embodiment. Although steps are shown in FIG. 15, and the following FIG. 16, as integral blocks in a particular order for purposes of illustration, in other embodiments steps or portions thereof are performed in a different order, or overlapping in time, in series or in parallel, or are omitted, or additional steps are added, or the method is changed in some combination of ways.

In step 1501 a substrate layer is prepared as a silicon-on-insulator substrate with silicon dioxide surface layer. For example, a commercially available silicon-on-insulator SOI substrate with a 300 nm-thick device layer and 1 μm-thick $SiO_2$ layer was used as the starting material.

In step 1503, a hotplate material is applied in a hotplate pattern, such as a micro-hotplate pattern. For example, the lightly doped device layer was n doped with phosphorous using a standard gas-phase diffusion process to achieve the desired micro-hotplate resistance value. The micro-hotplate patterns were defined in the $n^+$-Si device layer using optical lithography and reactive ion etching.

In step 505 an electrical barrier and heat spreading layer is deposited. For example, a 20 nm-thick conformal $Al_2O_3$ layer was deposited using atomic layer deposition. (ALD). This layer serves as both an electrical barrier layer that separates the conductive micro-hotplate from the $VO_2$ PCM layer. It also serves to spread the heat uniformly across the entire pixel area.

In step 1507 a PCM layer is deposited in a PCM element pattern. For example, the $VO_2$ layer is integrated onto the micro-hotplates by first sputtering a $VO_x$ film and then thermally annealing the film in $O_2$/Ar to convert the $VO_x$ into a single phase $VO_2$. The $VO_2$ PCM features are defined by patterning and reactive ion etching.

In step 1509 a capping material is deposited. For example, the device is completed by capping the entire structure with a second 20 nm-thick $Al_2O_3$ layer deposited by ALD.

In step 1511 control electronic components are connected to or deposited on the substrate between active areas of PCM elements.

In one embodiment of the method 1500, the following steps are performed. Clean silicon-on-insulator (SOI) substrate with 300 nm device layer and 1 μm thick $SiO_2$ layer using a standard clean process (RCA1 and RCA2). 2. Phosphorous diffusion of device layer: P2O5 at 1000° C. for 45 min. 3. Pattern alignment markers: Double layer photoresist (SF6 and 3012): SF6: 190° C. 5 min, 3012: 95° C. 1 min, Develop 3012 with CD26 ~1 min, DUV expose SF6 600s develop with 101A ~1 min). 4. Oxygen plasma descum: 200 W 1.5 min 5. Remove $SiO_2$ from diffusion: BOE 10:1 1 min. 6. Evaporate alignment marker: 10 nm/40 nm Ti/Pt. 7. Lift off metal and remove photoresist: Heated 1165 remover. 8. Pattern micro-hotplate etch mask: 3012 photoresist (HMDS 95° C. 1 min, 3012 95° C. 1 min, develop with CD26 ~1 min). 9. Reactive ion etch micro-hotplate: • $Cl_2$: 35 sccm; $O_2$: 5 sccm, 5 mTorr • RF1 (substrate power): 75 W • RF2 (ICP coil power): 500 W • Etch rate 10 nm/s. 10. Strip photoresist with 1165 remover. 11. Remove remaining $SiO_2$ layer from diffusion: BOE 10:1 1 min. 12. Deposit 20 nm-thick $Al_2O_3$ electrical barrier/heat spreading layer: substrate 300° C., $N_2$ flow 20 sccm, $H_2O$ pulse 0.015 sec, wait 10 sec, TMA pulse 0.015 sec, wait 10 sec, 200 cycles. 15. Sputter deposit $VO_x$ thin film. 16. Lift off $VO_x$ film: Heated 1165 remover. 17. Rapid thermal annealing of $VO_x$ to convert to single phase $VO_2$ thin film. 18. Pattern $VO_2$ etch mask: 3012 photoresist. 19. Reactive ion etch $VO_2$ • CF4:30 sccm; Ar: 60 sccm; 15 mTorr • RF1 (platen power): 250 W • RF2 (ICP coil power): 500 W • Etch rate ~20 nm/min. 20. Strip photoresist: 1165 remover. 21. Pattern $Al_2O_3$ contact windows: Single layer 3012 photoresist. 22. Reactive ion etch $Al_2O_3$ contact windows • BCl3:15 sccm, 3 mTorr • RF1 (platen power): 50 W • RF2 (ICP coil power): 600 W • Etch rate 0.4 nm/s. 23. Remove photo resist with 1165 remover. 24. Pattern micro-hotplate contact metal: Double layer photo resist (SF6, 3012). 25. Native oxide removal: BOE 10:1 20 s. 26. Evaporate contact metal: 10 nm/40 nm Ti\Pt. 27. Lift-off contact metal: heated 1165 remover. 28. Deposit 20 nm $Al_2O_3$ layer. 29. Pattern contact window etch mask: Single layer 3012 photoresist. 30. Reactive ion etch $Al_2O_3$ on top of contacts. All patterning steps used 0.27 sec exposure on the GCA 8000 stepper.

5. Method of Operation

Figure 16:
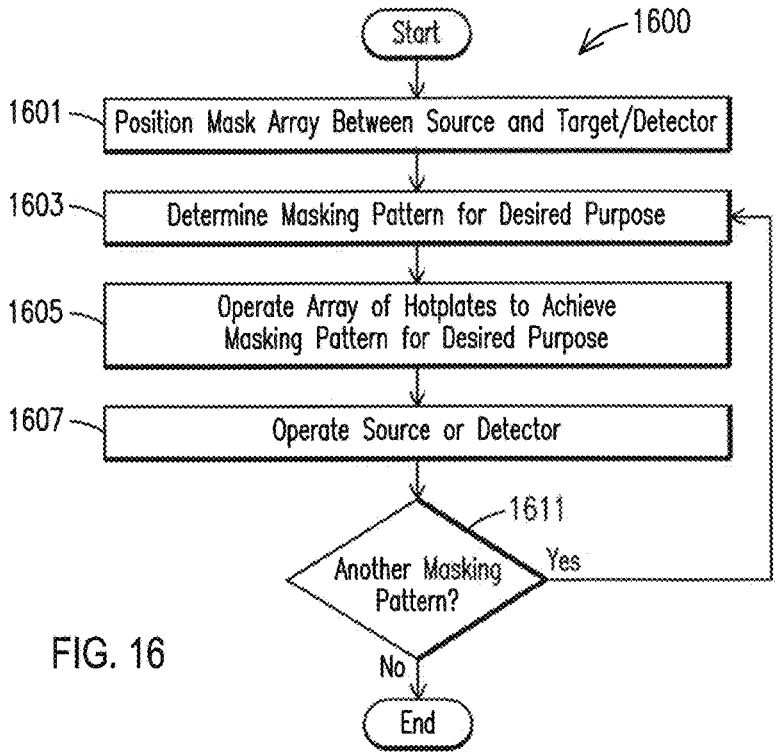
FIG. 16 is a flow chart that illustrates an example method for operating an individually addressable mask array, according to an embodiment.

FIG. 16 is a flow chart that illustrates an example method for operating an individually addressable mask array, according to an embodiment. In step 1601, a mask array device is positioned between a source and target or between a source and detector. In step 1603 a masking pattern is determined for a desired purpose, e.g., to reduce intensity in bright areas or for compressed sensing or to form an aperture for a desired target area or to shutter a bright IR flash. In some embodiments, step 1603 is performed on a computing device such as a computer system described below with reference to FIG. 17 or a processing chip set described below with reference to FIG. 18.

In step 1605 the mask array is operated by switching on for an appropriate time one or more hotplates on the mask array to achieve the masking pattern for the desired purpose. In some embodiments, the select bar and data line voltages are produced in response to computations made on the computer system or chip set described below.

In step 1607, while or after the masking pattern is imposed on the mask array, the source or detector is operated until a desired result is obtained. In some embodiments, the source or detector is operated and results recorded by the computer system or ship set described below.

In step 1611, it is determined whether to use a different masking pattern. If so, control passes back to step 1603 and following steps to determine and impose the new masking pattern on the mask array. Otherwise the process ends.

6. Computational Hardware

Figure 17:
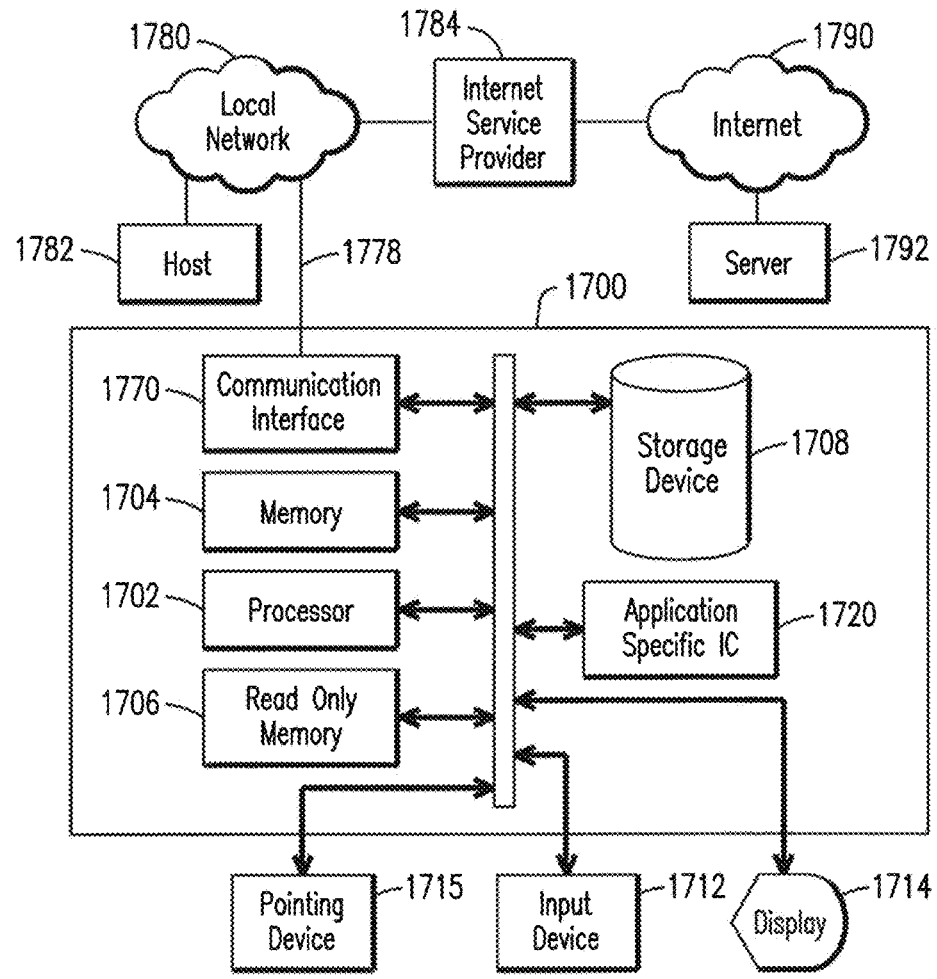
FIG. 17 is a block diagram that illustrates a computer system upon which an embodiment can be implemented, e.g., to determine the mask array elements to change, according to an embodiment.

FIG. 17 is a block diagram that illustrates a computer system 1700 upon which an embodiment of the invention may be implemented. Computer system 1700 includes a communication mechanism such as a bus 1710 for passing information between other internal and external components of the computer system 1700. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1700, or a portion thereof, constitutes a means for performing one or more steps of one or more methods described herein.

A sequence of binary digits constitutes digital data that is used to represent a number or code for a character. A bus 1710 includes many parallel conductors of information so that information is transferred quickly among devices coupled to the bus 1710. One or more processors 1702 for processing information are coupled with the bus 1710. A processor 1702 performs a set of operations on information. The set of operations include bringing information in from the bus 1710 and placing information on the bus 1710. The set of operations also typically include comparing two or more units of information, shifting positions of units of information, and combining two or more units of information, such as by addition or multiplication. A sequence of operations to be executed by the processor 1702 constitutes computer instructions.

Computer system 1700 also includes a memory 1704 coupled to bus 1710. The memory 1704, such as a random access memory (RAM) or other dynamic storage device, stores information including computer instructions. Dynamic memory allows information stored therein to be changed by the computer system 1700. RAM allows a unit of information stored at a location called a memory address to be stored and retrieved independently of information at neighboring addresses. The memory 1704 is also used by the processor 1702 to store temporary values during execution of computer instructions. The computer system 1700 also includes a read only memory (ROM) 1706 or other static storage device coupled to the bus 1710 for storing static information, including instructions, that is not changed by the computer system 1700. Also coupled to bus 1710 is a non-volatile (persistent) storage device 1708, such as a magnetic disk or optical disk, for storing information, including instructions, that persists even when the computer system 1700 is turned off or otherwise loses power.

Information, including instructions, is provided to the bus 1710 for use by the processor from an external input device 1712, such as a keyboard containing alphanumeric keys operated by a human user, or a sensor. A sensor detects conditions in its vicinity and transforms those detections into signals compatible with the signals used to represent information in computer system 1700. Other external devices coupled to bus 1710, used primarily for interacting with humans, include a display device 1714, such as a cathode ray tube (CRT) or a liquid crystal display (LCD), for presenting images, and a pointing device 1716, such as a mouse or a trackball or cursor direction keys, for controlling a position of a small cursor image presented on the display 1714 and issuing commands associated with graphical elements presented on the display 1714.

In the illustrated embodiment, special purpose hardware, such as an application specific integrated circuit (IC) 1720, is coupled to bus 1710. The special purpose hardware is configured to perform operations not performed by processor 1702 quickly enough for special purposes. Examples of application specific ICs include graphics accelerator cards for generating images for display 1714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1700 also includes one or more instances of a communications interface 1770 coupled to bus 1710. Communication interface 1770 provides a two-way communication coupling to a variety of external devices that operate with their own processors, such as printers, scanners and external disks. In general the coupling is with a network link 1778 that is connected to a local network 1780 to which a variety of external devices with their own processors are connected. For example, communication interface 1770 may be a parallel port or a serial port or a universal serial bus (USB) port on a personal computer. In some embodiments, communications interface 1770 is an integrated services digital network (ISDN) card or a digital subscriber line (DSL) card or a telephone modem that provides an information communication connection to a corresponding type of telephone line. In some embodiments, a communication interface 1770 is a cable modem that converts signals on bus 1710 into signals for a communication connection over a coaxial cable or into optical signals for a communication connection over a fiber optic cable. As another example, communications interface 1770 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1770 sends and receives electrical, acoustic or electromagnetic signals, including infrared and optical signals that carry information streams, such as digital data.

The term computer-readable medium is used herein to refer to any medium that participates in providing information to processor 1702, including instructions for execution. Such a medium may take many forms, including, but not limited to, non-volatile media, volatile media and transmission media. Non-volatile media include, for example, optical or magnetic disks, such as storage device 1708. Volatile media include, for example, dynamic memory 1704. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1702, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1702, except for carrier waves and other signals.

Logic encoded in one or more tangible media includes one or both of processor instructions on a computer-readable storage media and special purpose hardware, such as ASIC *1720.

Network link 1778 typically provides information communication through one or more networks to other devices that use or process the information. For example, network link 1778 may provide a connection through local network 1780 to a host computer 1782 or to equipment 1784 operated by an Internet Service Provider (ISP). ISP equipment 1784 in turn provides data communication services through the public, world-wide packet-switching communication network of networks now commonly referred to as the Internet 1790. A computer called a server 1792 connected to the Internet provides a service in response to information received over the Internet. For example, server 1792 provides information representing video data for presentation at display 1714.

The invention is related to the use of computer system 1700 for implementing the techniques described herein. According to one embodiment of the invention, those techniques are performed by computer system 1700 in response to processor 1702 executing one or more sequences of one or more instructions contained in memory 1704. Such instructions, also called software and program code, may be read into memory 1704 from another computer-readable medium such as storage device 1708. Execution of the sequences of instructions contained in memory 1704 causes processor 1702 to perform the method steps described herein. In alternative embodiments, hardware, such as application specific integrated circuit 1720, may be used in place of or in combination with software to implement the invention. Thus, embodiments of the invention are not limited to any specific combination of hardware and software.

The signals transmitted over network link 1778 and other networks through communications interface 1770, carry information to and from computer system 1700. Computer system 1700 can send and receive information, including program code, through the networks 1780, 1790 among others, through network link 1778 and communications interface 1770. In an example using the Internet 1790, a server 1792 transmits program code for a particular application, requested by a message sent from computer 1700, through Internet 1790, ISP equipment 1784, local network 1780 and communications interface 1770. The received code may be executed by processor 1702 as it is received, or may be stored in storage device 1708 or other non-volatile storage for later execution, or both. In this manner, computer system 1700 may obtain application program code in the form of a signal on a carrier wave.

Various forms of computer readable media may be involved in carrying one or more sequence of instructions or data or both to processor 1702 for execution. For example, instructions and data may initially be carried on a magnetic disk of a remote computer such as host 1782. The remote computer loads the instructions and data into its dynamic memory and sends the instructions and data over a telephone line using a modem. A modem local to the computer system 1700 receives the instructions and data on a telephone line and uses an infra-red transmitter to convert the instructions and data to a signal on an infra-red carrier wave serving as the network link 1778. An infrared detector serving as communications interface 1770 receives the instructions and data carried in the infrared signal and places information representing the instructions and data onto bus 1710. Bus 1710 carries the information to memory 1704 from which processor 1702 retrieves and executes the instructions using some of the data sent with the instructions. The instructions and data received in memory 1704 may optionally be stored on storage device 1708, either before or after execution by the processor 1702.

Figure 18:
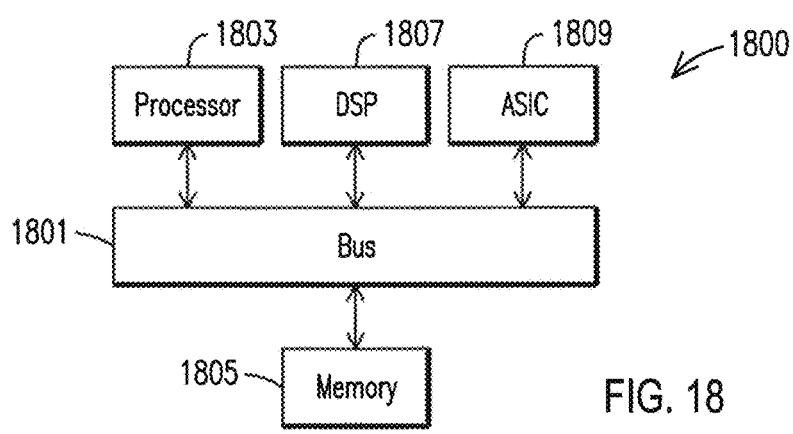
FIG. 18 is a chip set upon which an embodiment can be implemented, according to an embodiment.

FIG. 18 is a chip set upon which an embodiment can be implemented, according to an embodiment. Chip set 1800 is programmed to perform one or more steps of a method described herein and includes, for instance, the processor and memory components described with respect to FIG. 17 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1800, or a portion thereof, constitutes a means for performing one or more steps of a method described herein.

In one embodiment, the chip set 1800 includes a communication mechanism such as a bus 1801 for passing information among the components of the chip set 1800. A processor 1803 has connectivity to the bus 1801 to execute instructions and process information stored in, for example, a memory 1805. The processor 1803 may include one or more processing cores with each core configured to perform independently. A multi-core processor enables multiprocessing within a single physical package. Examples of a multi-core processor include two, four, eight, or greater numbers of processing cores. Alternatively or in addition, the processor 1803 may include one or more microprocessors configured in tandem via the bus 1801 to enable independent execution of instructions, pipelining, and multithreading. The processor 1803 may also be accompanied with one or more specialized components to perform certain processing functions and tasks such as one or more digital signal processors (DSP) 1807, or one or more application-specific integrated circuits (ASIC) 1809. A DSP 1807 typically is configured to process real-world signals (e.g., sound) in real time independently of the processor 1803. Similarly, an ASIC 1809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1803 and accompanying components have connectivity to the memory 1805 via the bus 1801. The memory 1805 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1805 also stores the data associated with or generated by the execution of one or more steps of the methods described herein.

7. Alterations, Modifications, Extensions

While embodiments have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the embodiments not be limited to the particular embodiment disclosed as the best mode contemplated, but that all embodiments falling within the scope of the appended claims are considered. Moreover, unless specifically stated, any use of the terms first, second, etc., does not denote any order or importance, but rather the terms first, second, etc., are used to distinguish one element from another.

We claim:

1. An apparatus comprising:
   a monolithic structure comprising:
      a substrate layer transmissive for at least a portion of an infrared wavelength band; and
      an array of a plurality of pixel structures, each pixel structure in stacked relation above or below the substrate layer and comprising:
         at least one micro-plate heating element layer transmissive for at least the portion of the infrared wavelength band, and having switchable on and off states configured to produce temperature changes;
         circuitry configured to individually address the at least one micro-plate heating element layer to switch the at least one micro-plate heating element layer between the on and off states, the circuitry including at least one CMOS transistor; and
         at least one phase change material (PCM) element in stacked relation above or below the at least one micro-plate heating element layer and configured to change transmissive states in at least the portion of the infrared wavelength band in response to the temperature changes.

2. An apparatus as recited in claim 1, wherein the circuitry is not in stacked relation above or below the at least one PCM element.

3. An apparatus as recited in claim 1, wherein at least the portion of the infrared wavelength band comprises at least a portion of one or more of a middle wavelength infrared (MWIR) band and a long wavelength infrared (LWIR) band.

4. An apparatus as recited in claim 1, wherein the at least one micro-plate heating element layer is a silicon-based material selected from a group comprising:
   n-doped silicon;
   p-doped silicon; and
   polysilicon.

5. An apparatus as recited in claim 1, wherein the phase change material is a transition metal oxide-based material.

6. An apparatus as recited in claim 5, wherein the transition metal oxide-based material is vanadium dioxide ($VO_2$).

7. An apparatus as recited in claim 1, wherein the phase change material is a chalcogenide-based material.

8. An apparatus as recited in claim 7, wherein the chalcogenide-based material is Germanium Antimony (stibium) Tellurium (GST), $Ge_2Sb_2Te_5$.

9. An apparatus as recited in claim 1, the pixel structure further comprising a thermal spreading layer in stacked relation above or below the at least one micro-plate heating element layer and configured to remove heat from each PCM element of the array of PCM elements, wherein the thermal spreading layer is transmissive in at least the portion of the infrared wavelength band.

10. An apparatus as recited in claim 1, wherein the substrate layer is further configured to electrically insulate the at least one micro-plate heating element layer of the pixel structure from an external environment.

11. An apparatus as recited in claim 10, wherein the substrate layer is further configured to thermally insulate the at least one micro-plate heating element layer of the pixel structure from the external environment.

12. An apparatus as recited in claim 1, wherein the PCM is configured to undergo a refractive index change corresponding to a change between a blocking set state and a transmissive reset state for at least one portion of the infrared wavelength band.

13. An apparatus as recited in claim 12, wherein the pixel structure is configured with optical and thermal properties so that the switching of the at least one micro-plate heating element layer between the on and off states causes the PCM to undergo the refractive index and extinction coefficient change corresponding to the change between the set state and the reset state.

14. An apparatus as recited in claim 1, further comprising an insulating layer transmissive for at least the portion of the infrared wavelength band, the insulating layer in stacked relation between the substrate layer and the array of the plurality of pixel structures.

15. An apparatus as recited in claim 14, the pixel structure further comprising a thermal spreading layer transmissive in at least the portion of the infrared wavelength band, the thermal spreading layer in stacked relation between the at least one micro-plate heating element layer and the at least one PCM element of the array of PCM elements, the thermal spreading layer configured to remove heat from each PCM element of the array of PCM elements.

16. An apparatus as recited in claim 15, wherein the insulating layer is an electric and thermal insulating layer configured to electrically and thermally isolate the substrate layer from the array of the plurality of pixel structures, and
   wherein, for each pixel structure, the thermal spreading layer is an electric insulating and thermal spreading layer configured to electrically isolate the at least one micro-plate heating element layer from the at least one PCM element of the array of PCM elements.

17. The apparatus of claim 1, wherein in the on state the at least one micro-plate heating element layer is configured to heat the at least one PCM element to change the at least one PCM element from a transmissive state to a blocking state.

18. The apparatus of claim 1, wherein each pixel structure has a transmissive state and a blocking state, and in the transmissive state each pixel structure is configured to pass electromagnetic radiation through the pixel structure toward a downstream optical detector.

19. The apparatus of claim 1 wherein the at least one CMOS transistor of each of the plurality of pixel structures is configured to be electrically coupled to a first multiplexer and a second multiplexer, and to toggle from an on state to an off state in response to signals from the first multiplexer and the second multiplexer.

20. A system comprising:
an apparatus comprising a monolithic structure comprising:
  a substrate layer transmissive for at least a portion of an infrared wavelength band; and
  an array of a plurality of pixel structures, each pixel structure in stacked relation above or below the substrate layer and comprising:
    at least one micro-plate heating element layer transmissive for at least the portion of the infrared wavelength band, and having switchable on and off states configured to produce temperature changes;
    circuitry configured to individually address the at least one micro-plate heating element layer to switch the at least one micro-plate heating element layer between the on and off states, the circuitry including at least one CMOS transistor; and
    at least one phase change material (PCM) element in stacked relation above or below the at least one micro-plate heating element layer and configured to change transmissive states in at least the portion of the infrared wavelength band in response to the temperature changes;
an optical coupler configured to pass electromagnetic radiation from a target onto the apparatus; and
an optical detector configured to detect electromagnetic radiation passed through the apparatus.

21. A method comprising:
forming a substrate layer transmissive for at least a portion of an infrared wavelength ban; and
monolithically depositing an array of a plurality of pixel structures, further comprising forming each pixel structure by:
  depositing at least one micro-plate heating element layer transmissive for at least the portion of the infrared wavelength band, and having switchable on and off states configured to produce temperature changes;
  assembling circuitry configured to individually address the at least one micro-plate heating element layer to switch the at least one micro-plate heating element layer between the on and off states, the circuitry including at least one CMOS transistor; and
  depositing at least one phase change material (PCM) element in stacked relation above or below the at least one micro-plate heating element layer and configured to change transmissive states in at least the portion of the infrared wavelength band in response to the temperature changes.

22. A method as recited in claim 21, wherein the circuitry is not in stacked relation above or below the at least one PCM element.

23. A method as recited in claim 21, wherein the circuitry is complementary metal-oxide semiconductor circuitry.

24. An apparatus comprising:
a monolithic structure comprising:
  a substrate layer transmissive for at least a portion of an infrared wavelength band; and
  a plurality of separately addressable pixel structures, each pixel structure in stacked relation above or below the substrate layer and comprising:
    a phase change material (PCM) element having a blocking state and a transmissive state;
    a micro-plate heating element layer transmissive for at least the portion of the infrared wavelength band thermally coupled to the PCM element, the micro-plate heating element layer having an on state and an off state, wherein in the on state the micro-plate heating element layer is configured to heat the PCM element to cause the PCM element to change from the transmissive state to the blocking state; and
    circuitry configured to individually address the micro-plate heating element layer and switch the micro-plate heating element layer between the on state and the off state, the circuitry including at least one CMOS transistor; and
  a detector comprising a plurality of detector elements, the detector configured to detect electromagnetic radiation that passes completely through a pixel structure when the pixel structure is in the transmissive state.

* * * * *